United States Patent
Madan et al.

(10) Patent No.: US 10,143,002 B2
(45) Date of Patent: Nov. 27, 2018

(54) SYSTEM AND METHOD TO FACILITATE CENTRALIZED RADIO RESOURCE MANAGEMENT IN A SPLIT RADIO ACCESS NETWORK ENVIRONMENT

(71) Applicant: CISCO TECHNOLOGY, INC., San Jose, CA (US)

(72) Inventors: Ritesh K. Madan, Berkeley, CA (US); Rohit Umesh Nabar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 114 days.

(21) Appl. No.: 14/993,859

(22) Filed: Jan. 12, 2016

(65) Prior Publication Data

US 2017/0202005 A1 Jul. 13, 2017

(51) Int. Cl.
*H04W 72/12* (2009.01)
*H04W 28/16* (2009.01)
(Continued)

(52) U.S. Cl.
CPC ......... *H04W 72/1231* (2013.01); *H04L 47/26* (2013.01); *H04L 47/56* (2013.01); *H04L 47/6255* (2013.01); *H04W 28/16* (2013.01)

(58) Field of Classification Search
CPC ......... H04W 24/08; H04W 72/1226–72/1236; H04W 28/16; H04W 72/1231; H04L 47/26; H04L 47/56; H04L 47/6255
See application file for complete search history.

(56) References Cited

U.S. PATENT DOCUMENTS 6,141,565 A 10/2000 Feuerstein et al.
6,456,848 B1 9/2002 Freeman
(Continued)

FOREIGN PATENT DOCUMENTS

CN 1334999 A 2/2002
CN 101444125 A 5/2009
(Continued)

OTHER PUBLICATIONS

"ETSI TR 136 902 V9.3.1 (May 2011) Technical Report: LTE; Evolved Universal Terrestrial Radio Access Network 9E-UTRAN); Self-configuring and self-optimizing network (SON) use cases and solutions (3GPP TR 36.902 version 9.3.1 Release 9)," ETSI, European Telecommunications Standards Institute, 650 Route des Lucioles F-06921 Sophia Antipolis Cedex—France, May 2011; 23 pages.
(Continued)

*Primary Examiner* — Dung B Huynh
(74) *Attorney, Agent, or Firm* — Patterson + Sheridan, LLP

(57) ABSTRACT

A method is provided in one example embodiment and includes generating feedback information at a first remote access point (AP), wherein the feedback information is associated with one or more user equipment served by the first remote AP; determining constraints for the first remote AP at a central controller based on the feedback information received from the first remote AP and feedback information received from one or more other remote APs that neighbor the first remote AP, wherein the constraints are determined for a plurality of transmission time intervals (TTIs); and scheduling resource blocks (RBs) for the one or more user equipment served by the first remote AP for one or more of the plurality of TTIs based, at least in part, on constraints received from the central controller.

19 Claims, 9 Drawing Sheets

(51) Int. Cl.
  *H04L 12/875* (2013.01)
  *H04L 12/863* (2013.01)
  *H04L 12/825* (2013.01)

(56) References Cited

U.S. PATENT DOCUMENTS

| | | |
|---|---|---|
| 6,463,296 B1 | 10/2002 | Esmailzadeh |
| 6,600,924 B1 | 7/2003 | Sinivaara |
| 6,771,934 B2 | 8/2004 | Demers |
| 7,151,937 B2 | 12/2006 | Jin et al. |
| 7,158,474 B1 | 1/2007 | Gerakoulis |
| 7,379,739 B2 | 5/2008 | Rajkotia et al. |
| 7,884,763 B2 | 2/2011 | Na et al. |
| 7,974,652 B2 | 7/2011 | Gerlach |
| 7,983,667 B2 | 7/2011 | Hart et al. |
| 8,045,996 B2 | 10/2011 | Brunner et al. |
| 8,078,185 B2 | 12/2011 | Sun |
| 8,107,950 B2 | 1/2012 | Amerijoo et al. |
| 8,126,495 B2 | 2/2012 | Wu |
| 8,145,223 B2 | 3/2012 | Guey |
| 8,145,252 B2 | 3/2012 | Sung et al. |
| 8,170,544 B1 | 5/2012 | Satapathy et al. |
| 8,194,630 B2 | 6/2012 | Qvarfordt |
| 8,208,937 B2 | 6/2012 | Zhang |
| 8,229,451 B2 | 7/2012 | Frenger et al. |
| 8,270,976 B2 | 9/2012 | Simonsson et al. |
| 8,275,376 B2 | 9/2012 | Vikberg |
| 8,320,965 B2 | 11/2012 | Kwun |
| 8,340,711 B1 | 12/2012 | Glass et al. |
| 8,400,921 B2 | 3/2013 | Grayson et al. |
| 8,483,743 B2 | 7/2013 | Dimou |
| 8,538,337 B2 | 9/2013 | Damnjanovic |
| 8,588,698 B2 | 11/2013 | Brisebois |
| 8,611,299 B2 | 12/2013 | Yang et al. |
| 8,619,563 B2 | 12/2013 | Madan et al. |
| 8,639,243 B2 | 1/2014 | Radulescu et al. |
| 8,687,585 B2 | 4/2014 | Marks et al. |
| 8,694,044 B2 | 4/2014 | Hiltunen et al. |
| 8,712,459 B2 | 4/2014 | Lim et al. |
| 8,731,567 B2 | 5/2014 | Zhang |
| 8,743,772 B2 | 6/2014 | Garavaglia et al. |
| 8,755,791 B2 | 6/2014 | Bontu et al. |
| 8,761,826 B2 | 6/2014 | Brown et al. |
| 8,792,886 B2 | 7/2014 | Meshkati |
| 8,797,983 B2 | 8/2014 | Sun |
| 8,805,373 B2 | 8/2014 | Chayat |
| 8,805,385 B2 | 8/2014 | Hunukumbure |
| 8,830,936 B2 | 9/2014 | Ren |
| 8,838,125 B2 | 9/2014 | Dalsgaard et al. |
| 8,854,998 B2 | 10/2014 | Johansson et al. |
| 8,862,134 B1 | 10/2014 | Zhou |
| 8,874,126 B2 | 10/2014 | Jeong et al. |
| 8,879,441 B2 | 11/2014 | Hunukumbure |
| 8,983,470 B1 | 3/2015 | Ryan |
| 9,014,004 B2 | 4/2015 | Nuss et al. |
| 9,094,831 B2 | 7/2015 | Borran |
| 9,143,995 B2 | 9/2015 | Okmyanskiy et al. |
| 9,148,838 B2 | 9/2015 | Yanover et al. |
| 9,167,444 B2 | 10/2015 | Nuss et al. |
| 9,197,358 B2 | 11/2015 | Hejazi |
| 9,219,816 B2 | 12/2015 | Grayson |
| 9,313,004 B2 | 4/2016 | Yanover et al. |
| 9,332,458 B2 | 5/2016 | Nuss et al. |
| 9,344,970 B2 | 5/2016 | Uplenchwar et al. |
| 9,414,310 B2 | 8/2016 | Grayson |
| 9,490,953 B2 | 11/2016 | Yanover et al. |
| 9,497,708 B2 | 11/2016 | Uplenchwar et al. |
| 9,544,857 B2 | 1/2017 | Carter et al. |
| 9,559,798 B2 | 1/2017 | Nuss et al. |
| 9,648,569 B2 | 5/2017 | Madan et al. |
| 9,655,102 B2 | 5/2017 | Uplenchwar et al. |
| 2002/0019245 A1 | 2/2002 | Longoni |
| 2002/0061742 A1 | 5/2002 | Lapaille |
| 2004/0085909 A1 | 5/2004 | Soliman |
| 2004/0132486 A1 | 7/2004 | Halonen |
| 2004/0213170 A1 | 10/2004 | Bremer |
| 2005/0063389 A1 | 3/2005 | Elliott |
| 2005/0064820 A1 | 3/2005 | Park et al. |
| 2005/0215251 A1 | 9/2005 | Krishnan et al. |
| 2005/0282572 A1 | 12/2005 | Wigard et al. |
| 2006/0068712 A1 | 3/2006 | Kroboth et al. |
| 2006/0073791 A1 | 4/2006 | Senarath |
| 2006/0229087 A1 | 10/2006 | Davis et al. |
| 2007/0008885 A1 | 1/2007 | Bonner |
| 2007/0082620 A1 | 4/2007 | Zhang et al. |
| 2007/0086406 A1 | 4/2007 | Papasakellariou |
| 2007/0115874 A1 | 5/2007 | Usuda |
| 2007/0177501 A1 | 8/2007 | Papasakellariou |
| 2007/0253372 A1 | 11/2007 | Nakayasu |
| 2007/0280170 A1 | 12/2007 | Kawasaki |
| 2008/0004028 A1 | 1/2008 | Vincent |
| 2008/0043623 A1 | 2/2008 | Franceschini |
| 2008/0045227 A1 | 2/2008 | Nagai |
| 2008/0084844 A1 | 4/2008 | Reznik |
| 2008/0107074 A1 | 5/2008 | Salmenkaita et al. |
| 2008/0139197 A1 | 6/2008 | Misra et al. |
| 2008/0188234 A1 | 8/2008 | Gorokhov |
| 2008/0188265 A1 | 8/2008 | Carter et al. |
| 2008/0232492 A1* | 9/2008 | Xiao ............... H04B 7/0417 375/260 |
| 2008/0268833 A1 | 10/2008 | Huang |
| 2009/0005030 A1 | 1/2009 | Han |
| 2009/0054047 A1 | 2/2009 | Kylvaja |
| 2009/0061778 A1 | 3/2009 | Vrzic |
| 2009/0067370 A1 | 3/2009 | Kim |
| 2009/0081955 A1 | 3/2009 | Necker |
| 2009/0092080 A1 | 4/2009 | Balasubramanian |
| 2009/0092088 A1 | 4/2009 | Kokku |
| 2009/0129284 A1 | 5/2009 | Jung et al. |
| 2009/0129291 A1 | 5/2009 | Gupta |
| 2009/0197632 A1 | 8/2009 | Ghosh |
| 2009/0232074 A1 | 9/2009 | Yang et al. |
| 2009/0270109 A1 | 10/2009 | Wang |
| 2009/0323530 A1 | 12/2009 | Trigui et al. |
| 2010/0009634 A1 | 1/2010 | Budianu |
| 2010/0029282 A1 | 2/2010 | Stamoulis et al. |
| 2010/0034157 A1 | 2/2010 | Stolyar et al. |
| 2010/0035653 A1* | 2/2010 | Chang ............... H04W 52/346 455/561 |
| 2010/0056184 A1 | 3/2010 | Vakil |
| 2010/0093358 A1 | 4/2010 | Cheong et al. |
| 2010/0099424 A1 | 4/2010 | Centonza |
| 2010/0105406 A1 | 4/2010 | Luo |
| 2010/0110989 A1 | 5/2010 | Wu |
| 2010/0112982 A1 | 5/2010 | Singh et al. |
| 2010/0124930 A1 | 5/2010 | Andrews |
| 2010/0177722 A1 | 7/2010 | Guvenc |
| 2010/0227611 A1 | 9/2010 | Schmidt et al. |
| 2010/0240314 A1 | 9/2010 | Chang |
| 2010/0248737 A1 | 9/2010 | Smith |
| 2010/0260036 A1 | 10/2010 | Molnar et al. |
| 2010/0260068 A1 | 10/2010 | Bhatt et al. |
| 2010/0267338 A1 | 10/2010 | Chiu |
| 2010/0267408 A1* | 10/2010 | Lee ............... H04W 52/243 455/509 |
| 2010/0273498 A1* | 10/2010 | Kim, II ............... H04W 24/02 455/450 |
| 2010/0275083 A1 | 10/2010 | Nam et al. |
| 2010/0279628 A1 | 11/2010 | Love et al. |
| 2010/0285795 A1 | 11/2010 | Whinnett |
| 2010/0311449 A1 | 12/2010 | Whinnett |
| 2010/0317351 A1 | 12/2010 | Gerstenberger |
| 2010/0322109 A1 | 12/2010 | Ahn |
| 2011/0034174 A1 | 2/2011 | Xu |
| 2011/0039539 A1 | 2/2011 | Wada et al. |
| 2011/0039570 A1 | 2/2011 | Maida et al. |
| 2011/0070911 A1 | 3/2011 | Zhang |
| 2011/0077016 A1 | 3/2011 | Stolyar et al. |
| 2011/0081865 A1 | 4/2011 | Xiao |
| 2011/0086614 A1 | 4/2011 | Brisebois |
| 2011/0092209 A1 | 4/2011 | Gaal |
| 2011/0098072 A1 | 4/2011 | Kim |
| 2011/0201277 A1 | 4/2011 | Eguchi |
| 2011/0110316 A1 | 5/2011 | Chen et al. |

(56) References Cited

U.S. PATENT DOCUMENTS

| | | |
|---|---|---|
| 2011/0128862 A1 | 6/2011 | Kallin |
| 2011/0134876 A1* | 6/2011 | Takada .............. H04W 72/0406 370/329 |
| 2011/0136478 A1 | 6/2011 | Trigui |
| 2011/0151877 A1 | 6/2011 | Tafreshi |
| 2011/0151881 A1 | 6/2011 | Chou |
| 2011/0171911 A1 | 7/2011 | Liu |
| 2011/0176497 A1 | 7/2011 | Gopalakrishnan |
| 2011/0182375 A1 | 7/2011 | Kim et al. |
| 2011/0188441 A1 | 8/2011 | Kim |
| 2011/0194423 A1 | 8/2011 | Cho |
| 2011/0195730 A1 | 8/2011 | Chami |
| 2011/0195732 A1 | 8/2011 | Kim |
| 2011/0211514 A1 | 9/2011 | Hamalainin |
| 2011/0223964 A1 | 9/2011 | Ebiko |
| 2011/0235598 A1 | 9/2011 | Hilborn |
| 2011/0250881 A1 | 10/2011 | Michel et al. |
| 2011/0287755 A1 | 11/2011 | Cho |
| 2011/0306347 A1 | 12/2011 | Choi |
| 2011/0310879 A1 | 12/2011 | Wu |
| 2011/0317742 A1 | 12/2011 | Kawahatsu |
| 2012/0004003 A1 | 1/2012 | Shaheen et al. |
| 2012/0015655 A1 | 1/2012 | Lee |
| 2012/0028584 A1 | 2/2012 | Zhang et al. |
| 2012/0028664 A1* | 2/2012 | Zhang .................. H04W 16/14 455/501 |
| 2012/0046026 A1 | 2/2012 | Chande |
| 2012/0046028 A1 | 2/2012 | Damnjanovic |
| 2012/0046063 A1 | 2/2012 | Chande |
| 2012/0051315 A1* | 3/2012 | Wang .................. H04W 72/082 370/329 |
| 2012/0083201 A1 | 4/2012 | Truong |
| 2012/0087247 A1 | 4/2012 | Min et al. |
| 2012/0100849 A1 | 4/2012 | Marisco |
| 2012/0115534 A1 | 5/2012 | Luo |
| 2012/0129537 A1 | 5/2012 | Liu et al. |
| 2012/0157155 A1 | 6/2012 | Cho |
| 2012/0176980 A1 | 7/2012 | Moon et al. |
| 2012/0178451 A1 | 7/2012 | Kubota |
| 2012/0214498 A1* | 8/2012 | Joko ................. H04W 72/0426 455/449 |
| 2012/0231797 A1 | 9/2012 | Van Phan et al. |
| 2012/0235774 A1 | 9/2012 | Guey et al. |
| 2012/0238263 A1 | 9/2012 | Caretti et al. |
| 2012/0243431 A1 | 9/2012 | Chen et al. |
| 2012/0252469 A1* | 10/2012 | Okino .................. H04W 16/10 455/449 |
| 2012/0258720 A1 | 10/2012 | Tinnakornsurisphap et al. |
| 2012/0265888 A1 | 10/2012 | Roeland et al. |
| 2012/0270536 A1 | 10/2012 | Ratasuk |
| 2012/0282964 A1 | 11/2012 | Xiao et al. |
| 2012/0331478 A1* | 12/2012 | Zhu .................. H04W 72/0486 718/104 |
| 2013/0003697 A1 | 1/2013 | Adjakple et al. |
| 2013/0005388 A1 | 1/2013 | Naka |
| 2013/0021962 A1 | 1/2013 | Hu et al. |
| 2013/0029669 A1 | 1/2013 | Boudreau |
| 2013/0044704 A1 | 2/2013 | Pang |
| 2013/0077482 A1 | 3/2013 | Krishna et al. |
| 2013/0079007 A1 | 3/2013 | Nagaraja et al. |
| 2013/0095872 A1* | 4/2013 | Sediq .................. H04W 52/244 455/509 |
| 2013/0107798 A1 | 5/2013 | Gao et al. |
| 2013/0109380 A1 | 5/2013 | Centonza |
| 2013/0121257 A1 | 5/2013 | He et al. |
| 2013/0136072 A1 | 5/2013 | Bachmann et al. |
| 2013/0137447 A1 | 5/2013 | Zhang et al. |
| 2013/0142100 A1* | 6/2013 | Vrzic .................. H04J 11/0053 370/312 |
| 2013/0142116 A1 | 6/2013 | Prakash |
| 2013/0157680 A1 | 6/2013 | Morita |
| 2013/0163543 A1 | 6/2013 | Freda et al. |
| 2013/0182680 A1 | 7/2013 | Choi et al. |
| 2013/0188576 A1* | 7/2013 | Chao .................. H04L 47/00 370/329 |
| 2013/0210431 A1 | 8/2013 | Abe |
| 2013/0229945 A1 | 9/2013 | Cha et al. |
| 2013/0242748 A1 | 9/2013 | Mangalvedhe et al. |
| 2013/0250875 A1 | 9/2013 | Chen et al. |
| 2013/0279403 A1 | 10/2013 | Takaoka |
| 2013/0294356 A1 | 11/2013 | Bala et al. |
| 2013/0308531 A1 | 11/2013 | So et al. |
| 2013/0310019 A1 | 11/2013 | Visotsky |
| 2013/0310103 A1 | 11/2013 | Madan et al. |
| 2013/0326001 A1 | 12/2013 | Jorgensen et al. |
| 2013/0331079 A1 | 12/2013 | Racz et al. |
| 2013/0337821 A1 | 12/2013 | Clegg |
| 2013/0339783 A1 | 12/2013 | Alonso et al. |
| 2013/0343304 A1 | 12/2013 | Kaippallimalil et al. |
| 2013/0343755 A1 | 12/2013 | Cvijetic et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0018073 A1 | 1/2014 | Frenger |
| 2014/0029524 A1 | 1/2014 | Dimou et al. |
| 2014/0056220 A1 | 2/2014 | Poitau et al. |
| 2014/0056278 A1 | 2/2014 | Marinier et al. |
| 2014/0073304 A1 | 3/2014 | Brisebois |
| 2014/0073342 A1* | 3/2014 | Lioulis .................. H04W 64/00 455/452.2 |
| 2014/0078986 A1 | 3/2014 | Kaippallimalil et al. |
| 2014/0086226 A1 | 3/2014 | Zhao et al. |
| 2014/0087747 A1 | 3/2014 | Kronestedt |
| 2014/0092765 A1 | 4/2014 | Agarwal et al. |
| 2014/0098757 A1 | 4/2014 | Khandekar |
| 2014/0106765 A1* | 4/2014 | Cao .................. H04W 72/082 455/452.1 |
| 2014/0112251 A1 | 4/2014 | Kim et al. |
| 2014/0113643 A1 | 4/2014 | Ma et al. |
| 2014/0126537 A1 | 5/2014 | Chen et al. |
| 2014/0146732 A1 | 5/2014 | Olufunmilola et al. |
| 2014/0148149 A1 | 5/2014 | Kwan |
| 2014/0148179 A1 | 5/2014 | Das et al. |
| 2014/0153439 A1 | 6/2014 | Nuss et al. |
| 2014/0155081 A1 | 6/2014 | Nuss |
| 2014/0155109 A1 | 6/2014 | Vaidya et al. |
| 2014/0169409 A1 | 6/2014 | Ma et al. |
| 2014/0170965 A1 | 6/2014 | Li |
| 2014/0171143 A1 | 6/2014 | Liu |
| 2014/0185467 A1 | 7/2014 | Heo |
| 2014/0198678 A1 | 7/2014 | Kim et al. |
| 2014/0200001 A1 | 7/2014 | Song |
| 2014/0211739 A1 | 7/2014 | Kim et al. |
| 2014/0213274 A1 | 7/2014 | Weber et al. |
| 2014/0219117 A1 | 8/2014 | Meshkati et al. |
| 2014/0219197 A1 | 8/2014 | Chaudhuri |
| 2014/0220990 A1 | 8/2014 | Lorca Hernando |
| 2014/0226736 A1 | 8/2014 | Niu et al. |
| 2014/0233468 A1 | 8/2014 | Hejazi |
| 2014/0233530 A1 | 8/2014 | Damnjanovic |
| 2014/0241316 A1 | 8/2014 | Okmyanskiy et al. |
| 2014/0243005 A1 | 8/2014 | Yanover et al. |
| 2014/0269323 A1* | 9/2014 | Mahindra .............. H04W 28/12 370/236.1 |
| 2014/0269355 A1 | 9/2014 | Monogioudis et al. |
| 2014/0273852 A1 | 9/2014 | McCormack et al. |
| 2014/0274195 A1 | 9/2014 | Singh |
| 2014/0293906 A1 | 10/2014 | Chang et al. |
| 2014/0302851 A1 | 10/2014 | Yiu |
| 2014/0302859 A1 | 10/2014 | Nama |
| 2014/0307685 A1 | 10/2014 | Takano |
| 2014/0321304 A1 | 10/2014 | Yu |
| 2014/0328277 A1 | 11/2014 | Xiao et al. |
| 2014/0328327 A1 | 11/2014 | Xiao et al. |
| 2014/0335909 A1 | 11/2014 | Czerepinski |
| 2014/0370908 A1* | 12/2014 | Lee .................. H04L 5/0032 455/452.1 |
| 2014/0378145 A1 | 12/2014 | Legg |
| 2015/0004975 A1 | 1/2015 | Yamamoto |
| 2015/0011222 A1 | 1/2015 | Brisebois et al. |
| 2015/0011229 A1 | 1/2015 | Morita et al. |
| 2015/0018028 A1 | 1/2015 | Uplenchwar et al. |

(56) References Cited

U.S. PATENT DOCUMENTS

| | | | |
|---|---|---|---|
| 2015/0038190 | A1 | 2/2015 | Carter et al. |
| 2015/0055479 | A1 | 2/2015 | Reider |
| 2015/0063223 | A1 | 3/2015 | Shen |
| 2015/0063225 | A1 | 3/2015 | Kanamarlapudi |
| 2015/0063231 | A1 | 3/2015 | Seo et al. |
| 2015/0078161 | A1* | 3/2015 | Elsherif ............... H04W 16/04 370/235 |
| 2015/0087325 | A1 | 3/2015 | Nuss et al. |
| 2015/0105025 | A1 | 4/2015 | Zhang |
| 2015/0138981 | A1 | 5/2015 | Nuss et al. |
| 2015/0141027 | A1 | 5/2015 | Tsui et al. |
| 2015/0146594 | A1 | 5/2015 | Grayson et al. |
| 2015/0148036 | A1 | 5/2015 | Grayson et al. |
| 2015/0208425 | A1 | 7/2015 | Caretti et al. |
| 2015/0237588 | A1 | 8/2015 | Zhao et al. |
| 2015/0237637 | A1 | 8/2015 | Venkatraman |
| 2015/0256314 | A1 | 9/2015 | Gauvreau et al. |
| 2015/0282033 | A1 | 10/2015 | Lunden |
| 2015/0282104 | A1 | 10/2015 | Damnjanovic |
| 2015/0312778 | A1 | 10/2015 | Chandrasekhar et al. |
| 2015/0318994 | A1 | 11/2015 | Walsh et al. |
| 2015/0351055 | A1* | 12/2015 | Senarath ............ H04W 52/226 455/509 |
| 2015/0351072 | A1 | 12/2015 | Okmyanskiy et al. |
| 2015/0365865 | A1 | 12/2015 | Bakker |
| 2015/0373698 | A1 | 12/2015 | Uplenchwar et al. |
| 2015/0382367 | A1 | 12/2015 | Yanover et al. |
| 2016/0073426 | A1 | 3/2016 | Bull et al. |
| 2016/0094319 | A1 | 3/2016 | Chaudhuri |
| 2016/0127069 | A1 | 5/2016 | Nuss et al. |
| 2016/0150442 | A1 | 5/2016 | Kwan |
| 2016/0157126 | A1 | 6/2016 | Nuss et al. |
| 2016/0165485 | A1 | 6/2016 | Kwan |
| 2016/0198412 | A1 | 7/2016 | Uplenchwar et al. |
| 2016/0211955 | A1 | 7/2016 | Wu |
| 2016/0219596 | A1 | 7/2016 | Yanover et al. |
| 2016/0242122 | A1 | 8/2016 | Yue |
| 2016/0249375 | A1* | 8/2016 | Auer ................. H04W 72/1226 |
| 2016/0309356 | A1 | 10/2016 | Madan et al. |
| 2016/0309476 | A1 | 10/2016 | Madan et al. |
| 2016/0315728 | A1 | 10/2016 | Palenius |
| 2016/0373202 | A1 | 12/2016 | Nuss et al. |
| 2017/0019902 | A1* | 1/2017 | Shahar ............. H04W 72/1268 |
| 2017/0034795 | A1 | 2/2017 | Madan |
| 2017/0034841 | A1* | 2/2017 | Bethanabhotla ...... H04W 28/08 |
| 2017/0041938 | A1 | 2/2017 | Nabar |
| 2017/0055225 | A1 | 2/2017 | Uplenchwar et al. |
| 2017/0064707 | A1 | 3/2017 | Xiao |
| 2017/0094611 | A1 | 3/2017 | Carter et al. |
| 2017/0150384 | A1 | 5/2017 | Rune |

FOREIGN PATENT DOCUMENTS

| | | |
|---|---|---|
| CN | 102 271 414 | 12/2011 |
| CN | 104684052 A | 6/2015 |
| EP | 1322048 | 6/2003 |
| EP | 1718090 | 11/2006 |
| EP | 1895801 | 3/2008 |
| EP | 2166714 | 3/2010 |
| EP | 2296394 | 3/2011 |
| EP | 2337395 | 6/2011 |
| EP | 2395701 | 12/2011 |
| EP | 2445265 | 4/2012 |
| EP | 2466972 | 6/2012 |
| EP | 2566261 | 3/2013 |
| EP | 2018781 | 4/2013 |
| EP | 2632072 | 8/2013 |
| EP | 2728926 | 5/2014 |
| EP | 2770773 | 8/2014 |
| EP | 2832150 | 2/2015 |
| EP | 2879444 | 6/2015 |
| GB | 2496908 | 5/2013 |
| GB | 2518584 | 4/2015 |
| WO | WO1998/024199 | 6/1998 |
| WO | WO2000/038351 | 6/2000 |
| WO | WO2007/074373 | 7/2007 |
| WO | WO2007/133135 | 11/2007 |
| WO | WO2010/006909 | 1/2010 |
| WO | WO2010/018929 | 2/2010 |
| WO | WO2010/064110 | 6/2010 |
| WO | WO2010/125151 | 11/2010 |
| WO | WO2011/085238 | 7/2011 |
| WO | WO2011/088465 | 7/2011 |
| WO | WO2011/090908 | 7/2011 |
| WO | WO2011/137345 | 11/2011 |
| WO | WO2012/148009 | 1/2012 |
| WO | WO2012/055984 | 5/2012 |
| WO | WO2012/079604 | 6/2012 |
| WO | WO2013/005016 | 1/2013 |
| WO | WO2013/041574 | 3/2013 |
| WO | WO2013/082245 | 6/2013 |
| WO | WO2013/086659 | 6/2013 |
| WO | WO2013/112082 | 8/2013 |
| WO | WO2013/144950 | 10/2013 |
| WO | WO2013/169991 | 11/2013 |
| WO | WO2014/001025 | 3/2014 |
| WO | WO2014/059935 | 4/2014 |
| WO | WO2014/064674 | 5/2014 |
| WO | WO2014/087392 | 6/2014 |
| WO | WO2014/087393 | 6/2014 |

OTHER PUBLICATIONS

"ETSI TS 123 007 V12.6.0 (Oct. 2014) Technical Specification: Digital Cellular Telecommunications System (Phase 2+); Universal Mobile Telecommunications System (UMTD); LTE; Restoration procedures (EGPP TS 23.007 version 12.6.0 Release 12)," ETSI, 650 Route des Lucioles, F-06921, Sophia Antipolis Cedex-France, Oct. 2014; 93 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex-France, Jun. 2010; See Section 4, pp. 15-46.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex-France, Jul. 2014.

"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex-France, Sep. 2014; 308 pages.

"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Route des Lucioles, F-06921 Sophia Antipolis Cedex, France; Jan. 2015; 77 pages.

"ETSI TS 125 133 V12.6.0 (Jan. 2013) Technical Specification: Universal Mobile Telecommunications System 9UMTS); Requirements for support of radio resource management (FDD) (3GPP TS 25.133 version 12.6.0 Release 12);" ETSI, European Telecommunications Standards Institute 2012, 650 Route des Lucioles, F-06921 Sophia Antipolis Cedex—France, Jan. 2015; 368 pages.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only] ; ETSI, 650 Route des Lucioles, F-06921, Sophia Antipolis Cedex-France, Jul. 2014.

"ETSI TS 125 215 V 12.0.0 (Sep. 2014) Technical Specification: Universal Mobile Telecommunications System (UMTS); Physical

(56) References Cited

OTHER PUBLICATIONS layer; Measurements (FDD) (3GPP TS 25.215 verizon 12.0.0 Release 12);" ETSI, European Telecommunications Standards Institute 2012, 650 Route des Luciloes, F-06921, Sophia Antipolis Cedex—France, Sep. 2014: 26 pages.

"ETSI TS 125 224 V12.0.0 (Sep. 2014) Technical Specification: Universal Mobile Telecommunications System (UMTS); Physical layer procedures (TDD) (3GPP TS 25.224 version 12.0.0 Release 12);" ETSI, European Telecommunications Standards Institute 2012, 650 Route des Luciloes, F-06921 Sophia Antipolis Cedex—France, Sep. 2014; 86 pages.

"ETSI TS 125 331 V11.10.0 (Jul. 2014) Technical Specification: Universal Mobile Telecommunications System (UMTS); Radio Resource Control (RRC); Protocol Specification," ETSI, 650 Route des Luciloes, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8—8.3.9 pp. 289-292; §8.5.21 pp. 357-365; §10.2.7 pp. 620-623; Annex B.3 pp. 2045-2052].

"ETSI TS 125 367 V9.4.0, Universal Mobile Telecommunications System (UMTS); Mobility procedures for Home Node B (HNB); Overall description; Stage 2 (3GPP T525.367 version 9.4.0 Release 9)", European Telecommunications Standards Institute, 650 Route des Luciloes, F-06921 Sophia Antipolis Cedex, France, Jun. 2010; 17 pages.

"ETSI TS-125-469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," ©European Telecommunications Standards Institute 2010; Oct. 2010; 64 pages.

"ETSI TS 125 469 v11.2.0, Universal Mobile Telecommunications System (UMTS); UTRAN Iuh interface Home Node B (HNB); Application Part (HNBAP) signalling (3GPP T525.469 version 11.2.0 Release 11)," European Telecommunications Standards Institute, 650 Route des Luciloes, F-06921 Sophia Antipolis Cedex, France, Apr. 2013, 78 pages.

"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Luciloes, F-06921, Sophia Antipolis Cedex—France, Oct. 2014; 170 pages.

"ETSI TS 129 212 V12.6.0 (Oct. 2014) Technical Specification: Universal Mobile Telecommunications System (UMTS); LTE; Policy and Charging Control (PCC); Reference Points (EGPP TS 29.212 version 12.6.0 Release 12)," ETSI, 650 Route des Luciloes, F-06921, Sophia Antipolis Cedex—France, Oct. 2014, 232 pages.

"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP Ts 29.213 version 12.5.0 Release 12),"[Relevant Sections 3, 4, 8 and 8 only], ETSI, 650 Route des Luciloes, F-06921, Sophia Antipolis Cedex—France, Oct. 2014.

"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Luciloes, F-06921, Sophia Antipolis Cedex—France, Oct. 2014; 64 pages.

"ETSI TS 136 111 V12.0.0 (Oct. 2014) Technical Specification: LTE; Location Measurement Unit (LMU) performance specification; Network based positioning systems in Evolved Universal Terrestrial Radio Access Network (E-UTRAN) (3GPP TS 36.111 version 12.0.0 Release 12);" ETSI, European Telecommunications Standards Institute 2012, 650 Route des Luciloes, F-06921 Sophia Antipolis Cedex—France; Oct. 2014.

"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Luciloes, F-06921, Sophia Antipolis Cedex—France, Nov. 2014.

"ETSI TS 136 133 V12-9-0 (Oct. 2015) Technical Specification: LTE; Evolved Universal Terrestrial Radio Access (E-UTRA); Requirements for support of Radio Resource management (3GPP TS 36.133 version 12.9.0 Release 12)," ETSI, European Telecommunications Standards Institute, 650 Route des Luciloes F-06921 Sophia Antipolis Sections 1 thru 9 only, 252 pages.

"ETSI TS 136 201 V12.1.0 (Feb. 2015) Technical Specificaton: LTE; Evolved Universal Terrestrial Radio Access (E-UTRA); LTE physical layer; General description (3GPP TS 36.201 version 12.1.0 Release 12);" ETSI, European Telecommunications Standards Institute 2012, 650 Route des Luciloes, F-06921 Sophia Antipolis Cedex—France, Feb. 2015; 15 pages.

"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12);" ETSI, European Telecommunications Standards Institute, 650 Route des Luciloes F-06921 Sophia Antipolis Cedex—France; Apr. 2015.

"ETSI TS 136 213 V12.4.0 (Feb. 2015) Technical Specification: LTE; Evolved Universal Terrestrial Radio Access (E-UTRA); Physical layer procedures (3GPP TS 36.213 version 12.4.0 Release 12);" ETSI, European Telecommunications Standards Institute 2012, 650 Route des Luciloes, F-06921 Sophia Antipolis Cedex—France, Feb. 2015; 227 pages.

"ETSI TS 136 213 V12.7.0 (Oct. 2015) Technical Specification: LTE; Evolved Universal Terrestrial Radio Access (E-UTRA); Physical layer procedures (3GPP TS 36.213 version 12.7.0 Release 12);" ETSI, European Telecommunications Standards Institute, 650 Route des Luciloes F-06921 Sophia Antipolis Cedex—France, Oct. 2015; 243 pages.

"ETSI TS 136 213 V9.3.0 (Oct. 2010) Technical Specification: LTE; Evolved Universal Terrestrial Radio Access (E-UTRA); Physical layer procedures (3GPP TS 36.213 version 9.3.0 Release 9);" ETSI, European Telecommunications Standards Institute 2012, 650 Route des Luciloes, F-06921 Sophia Antipolis Cedex—France; Oct. 2010.

"ETSI TS 136 214 V9.2.0 (Jun. 2010) Technical Specification: LTE; Evolved Universal Terrestrial Radio Access (E-UTRA); Physical layer; Measurements (3GPP TS 36.214 version 9.2.0 Release 9);" ETSI, European Telecommunications Standards Institute 2012, 650 Route des Luciloes, F-06921 Sophia Antipolis Cedex—France; Jun. 2010.

"ETSI TS 136 300 V12-7-0 (Oct. 2015) Technical Spefiction: LTE; Evolved Universal Terrestrial Radio Access (E-UTRA) and Evolved Universal Terrestrial Radio Access Network (E-UTRAN); Overall description; Stage 2 (3GPP TS 36.300 version 12.7.0 Release 12);" ETSI, European Telecommunications Standards Institue, 650 Route des Luciloes F-06921 Sophia Antipolis Cedex—France, Oct. 2015; 264 pages.

"ETSI TS 136 304 V12-6-0 (Nov. 2015) Technical Specification: LTE; Evolved Universal Terrestrial Radio Access (E-UTRA); User Equipment (UE) procedures in idle mode (3GPP TS 36.304 version 12.6.0 Release 12);" ETSI, European Telecommunications Standards Institute, 650 Route de Luciloes F-06921 Sophia Antipolis Cedex—France, Nov. 2015; 40 pages.

"ETSI TS 136 321 V12.7.0 (Oct. 2015) Technical Specification: LTE; Evolved Universal Terrestrial Radio Access (E-UTRA); Medium Access Control (MAC) protocol specification (3GPP TS 36.321 version 12.7.0 Release 12);" ETSI, European Telecommunications Standards Institute, 650 Route des Luciloes F-06921 Sophia Antipolis Cedex—France, Oct. 2015; 79 pages.

"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Luciloes, F-06921, Sophia Antipolis Cedex—France, Sep. 2014.

"ETSI TS 136 331 V12.7.0 (Oct. 2015) Technical Specification: LTE; Evolved Universal Terrestrial Radio Access (E-UTRA); Radio Resource Control (RRC); Protocol Specification (3GPP TS 36.331

(56) References Cited

OTHER PUBLICATIONS version 12.7.0 Release 12);" ETSI, European Telecommunications Standards Institute, 650 Route des Lucioles F-06921 Sophia Antipolis Cedex—France, Oct. 2015; 455 pages.
"ETSI TS 136 423 V8.3.0 (Nov. 2008) Technical Specification: LTE; Evolved Universal Terrestrial Radio Access Network (E-UTRAN); X2 Application Protocol (X2AP) (3GPP TS 36.423 version 8.3.0 Release 8);" ETSI, European Telecommunications Standards Institute 2012, 650 Route des Lucioles, F06921 Sophia Antipolis Cedex—France; Nov. 2008.
"ETSI TS 136 211 V12.4.0 (Feb. 2015) Technical Specification: LTE; Evolved Universal Terrestrial Radio Access (E-UTRA); Physical channels and modulation (3GPP TS 36.211 version 12.4.0 Release 12);" ETSI, European Telecommunications Standards Institute 2012, 650 Route des Lucioles, F-06921 Sophia Antipolis Cedex—France, Feb. 2015; 126 pages.
"ETSI TS 136 211 V12.5.0 (Apr. 2015) Technical Specification: LTE; Evolved Universal Terrestrial Radio Access (E-UTRA); Physical channels and modulation (3GPP TS 36.211 version 12.5.0 Release 12)," ETSI, European Telecommunications Standards Institute 2012, 650 Route des Lucioles, F-06921 Sophia Antipolis Cedex—France, Apr. 2015; 139 pages.
"ETSI TS 136 212 V12.3.0 (Feb. 2015) Technical Specification: LTE; Evolved Universal Terrestrial Radio Access (E-UTRA); Multiplexing and channel coding (3GPP TS 36.212 version 12.3.0 Release 12);" ETSI, European Telecommunications Standards Institute 2012, 650 Route des Lucioles, F-06921 Sophia Antipolis Cedex—France, Feb. 2015; 91 pages.
"ETSI TS 136 212 V12.6.0 (Oct. 2015) Technical Specification: LTE; Evolved Universal Terrestrial Radio Access (E-UTRA); Multiplexing and channel coding (3GPP TS 36.212 version 12.6.0 Release 12);" ETSI, European Telecommunications Standards Institute, 650 Route des Lucioles F-06921 Sophia Antipolis Cedex—France, Oct. 2015; 96 pages.
"ETSI TS 136 214 V10.1.0 (Apr. 2011) Technical Specification: LTE; Evolved Universal Terrestrial Radio Access (E-UTRA); Physical layer; Measurements (3GPP TS 36.214 version 10.1.0 Release 10);" ETSI, European Telecommunications Standards Institute 2012, 650 Route des Lucioles, F-06921 Sophia Antipolis Cedex—France, Apr. 2011; 15 pages.
"ETSI TS 136 300 V12.4.0 (Feb. 2015) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 12.4.0 Release 12);" ETSI, European Telecommunications Standards Institute 2012, 650 Route des Lucioles, F-06921 Sophia Antipolis Cedex—France, Feb. 2015; 266 pages.
"ETSI TS 136 423 V12.4.2 (Feb. 2015) Technical Specification: LTE; Evolved Universal Terrestrial Radio Access Network (E-UTRAN); X2 Application Protocol (X2AP) (3GPP TS 36.423 version 12.4.2 Release 12);" ETSI, European Telecommunications Standards Institute 2012, 650 Route des Lucioles, F-06921 Sophia Antipolis Cedex—France, Feb. 2015; 205 pages.
"ETSI TS-136-423 V9.4.0 (Oct. 2010) Technical Specification: LTE; Evolved Universal Terrestrial Radio Access Network (E-UTRAN); X2 Application Protocol (X2AP) (3GPP TS 36.423 version 9.4.0 Release 9)," ETSI, European Telecommunications Standards Institute, 650 Route des Lucioles F-06921 Sophia Antipolis Cedex—France, Oct. 2010, Section 8.3.8.
"ETSI GS NFV 002 V1.1.1 (Oct. 2013) Group Specification: Network Functions Virtualisation (NFV); Architectural Framework," ETSI, European Telecommunications Standards Institute, 650 Route des Lucioles F-06921 Sophia Antipolis Cedex—France, Oct. 2013; 21 pages.
"3GPP LTE Packet Data Convergence Protocol (PDCP) Sub Layer," EventHelix.com Inc., first published on or about Jan. 1, 2010; 20 pages.
"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.
"3GPP TR 36.814 V9.0.0 (Mar. 2010) Technical Report: 3rd Generation Partnership Project; Technical Specification Group Radio Access Network; Evolved Universal Terrestrial Radio Access (E-UTRA); Further advancements for E-UTRA physical layer aspects (Release 9);" 3rd Generation Partnership Project (3GPP), Mar. 2010.
"3GPP TR 23.852 (V12.0.0 (Sep. 2013) Technical Report: 3rd Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" 3rd Generation Partnership Project (3GPP), Sep. 2013, 157 pages.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"3GPP T523.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.
"3GPP TS 23.060 V13.0.0 (Sep. 2014) Technical Specification: 3rd Generation Partnership Project; Technical Specification Group Services and System Aspects; General Packet Radio Service (GPRS); Service description; Stage 2 (Release 13)," [Relevant Sections 5.3.20 and 6.2.3 only]; 3rd Generation Partnership Project; Sep. 2014.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 23.401 V13.3.0 (Jun. 2015) Technical Specification: 3rd Generation Partnership Project; Technical Specification Group Services and System Aspects;General Packet Radio Service (GPRS) enhancements for Evolved Universal Terrestrial Radio Access Network (E-UTRAN) access (Release 13)," 3rd Generation Partnership Project, 650 Route des Lucioles Sophia Antipolis Valbonne—France, Jun. 2015; Sections 4 and 5 only.
"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.
"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.
"3GPP TS 25.367 V11.0.0 (Jun. 2012) Technical Specification: Group Radio Access Network; Mobility procedures for Home Node B (HNG); Overall description; Stage 2 (Release 11)," 3rd Generation Partnership Project, Mobile Competence Centre; 650, Route Des Lucioles; F-06921 Sophia-Antipolis Cedex; France; Jun. 2012, 14 pages.
"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.
"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving Gprs Support Node (SGSN) related interfaces based on Diameter protocol (Release12)," [Relevant Sections 5 and 7.3.1-7.3.21 only]; 3rd Generation Partnership Project; Sep. 2014.

(56) References Cited

OTHER PUBLICATIONS

"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.

"3GPP TS 32.522 v11.2.0, 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.

"3GPP TS 36.300 V11.3.0 (Sep. 2012) Technical Specification: Group Radio Access Network; Evolved Universal Terrestrial Radio Access (E-UTRA) and Evolved Universal Terrestrial Radio Access Network (E-UTRAN); Overall Description; Stage 2 (Release 11)," 3rd Generation Partnership Project, Mobile Competence Centre; 650, Route Des Lucioles; F-06921 Sophia-Antipolis Cedex; France; Sep. 2012, 205 pages.

"3GPP TS 36.413 V9.5.1 (Jan. 2011)Technical Specification: 3rd Generation Partnership Project; Technical Specification Group Radio Access Network; Evolved Universal Terrestrial Radio Access Network (E-UTRAN); S1 Application Protocol (S1AP) (Release 9);" 3rd Generation Partnership Project, Jan. 2011.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.

"3GPP TS 37.320 V11.1.0 (Sep. 2012) Technical Specification: Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)," 3rd Generation Partnership Project, Mobile Competence Centre; 650, Route Des Lucioles; F-06921 Sophia-Antipolis Cedex; France; Sep. 2012, 21 pages.

"3GPP TS 48.008 V8.8.0 (Sec. 2009) Technical Specification: 3rd Generation Partnership Project; Technical Specification Group GSM/EDGE Radio Access Network; Mobile Switching Centre—Base Station System (MSC-BSS) interface; Layer 3 specification (Release 8);" 3rd Generation Partnership Project, Mobile Competence Centre; 650, Route Des Lucioles; F-06921 Sophia-Antipolis Cedex; France; Dec. 2009; 208 pages.

"3GPP Draft TR_R3018_V_100 (Oct. 2007) Technical Specification: Group Radio Access Network; Evolved UTRA and UTRAN; Radio Access Architecture and Interfaces (Release 7)," 3rd Generation Partnership Project, Mobile Competence Centre; 650, Route Des Lucioles; F-06921 Sophia-Antipolis Cedex; France; Oct. 2007, XP050423659.

3GPP Draft R1-124276, Research in Motion UK Limited, "Scoping the UMTS HetNet Study," 3rd Generation Partnership Project (3GPP), Mobile Competence Centre; 650; Route Des Lucioles; F-06921 Sophia-Antipolis; Sep. 2012; XP050662177.

3GPP Draft R3-071432, Telecom Italia, et al., "Self-optimization use case: self-tuning of cell reselction parameters for load balancing," 3rd Generation Partnership Project (3GPP), Mobile Competence Centre; 650; Route Des Lucioles; F-06921 Sophia-Antipolis; Aug. 2007; XP050162260.

3GPP TSG-RAN WG3 #61bis, R3-081174, "Solution for interference reduction SON use case," Orange, Alcatel-Lucent, Agenda Item 10.1.1c; Kansas City, MO, USA, May 5-9, 2008; 6 pages.

3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.

3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.

"4G++: Advanced Performance Boosting Techniques in 4th Generation Wireless Systems; A National Telecommunication Regulatory Authority Funded Project; Deliverable D4.1, Work Package 4, Inter-Cell Interference Coordination," 4G++ Project, Funded by the Egyptian National Telecommunications Regulatory Authority (NTRA); 75 pages First Published on or about Sep. 15, 2015.

Adrangi, F., et al., "Chargeable User Identity," Network Working Group RFC 4372, Jan. 2006, 10 pages.

Andrews, Matthew, et al., "Optimal Utility Based Multi-User Throughput Allocation Subject to Throughput Constraints," IEEE INFOCOM 2005, Mar. 13-17, 2005, Miami, FL; 10 pages.

Ashraf, Imran, "Distributed Radio Coverage Optimization in Enterprise Femtocell Networks," International Conference on Communications ICC 2010, May 23-27, 2010, Cape Town, South Africa; 6 pages.

Baid, Akash, et al., "Delay Estimation and Fast Iterative Scheduling Policies for LTE Uplink," HAL archives-ouvertes; HAL Id: hal-00763374, Submitted on Dec. 10, 2012; 9 pages https://hal.inria.fr/hal-00763374.

Basir, Adnan, "3GPP Long Term Evolution (LTEe, ICIC and eICIC," posted Jun. 11, 2012; 5 pages; http://4g-lte-world-blogspot.com/2012/06/icic-and-eicic.html.

Bernardos, Carlos J., et al., "Challenges of Designing Jointly the Backhaul and Radio Access Network in a Cloud-based Mobile Network," Future Network & Mobile Summit 2013 Conference Proceedings, Jul. 2013; 10 pages.

"Bisection Method," Wikipedia, the free encyclopedia, Aug. 26, 2015; 5 pages.

"Block Error Ratio (BLER) Measurement Description," Keysight Technologies, Feb. 28, 2014; 3 pages http://rfmw.em.keysight.com/rfcomms/refdocs/wcdma/wcdma_meas_wblerror_desc.ht ml.

"Broadband Forum Technical Report: TR-069 CPE WAN Management Protocol," Issue: 1, Amendment 4, Issue Date: Jul. 2011 Protocol Version 1.3; ©The Broadband Forum; 190 pages.

"Broadband Forum Technical Report: TR-069 CPE WAN Management Protocol," Issue: 1, Amendment 5, Issue Date: Nov. 2013 CWMP Version 1.4; ©The Broadband Forum; 228 pages.

"Broadband Forum Technical Report: TR-196 FRMTO Access Point Service Data Model," Issue: 2, Issue Date: Nov. 2011; 46 pages.

Calhoun, P., "Diameter Base Protocol," Network Working Group RFC 3488, Sep. 2003; 147 pages.

"Cisco ASR 5000 Series Small Cell Gateway," Cisco White Paper, C11-711704-00, Jul. 2012, Cisco Systems, Inc., Printed in USA, ©2012 Cisco and/or its affiliates. All Rights Reserved. 6 pages.

"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.

"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.

"Cisco's One Platform Kit (onePK)," Networking Software (IOS & NX-OS), Cisco Systems, Inc., First published on or about Mar. 3, 2014; 2 pages.

Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.

Do, Dr. Michelle M., et al., "Interference Coordination in LTE/LTE-A (2): eICIC (enhanced ICIC)," Netmanias Tech Blog, Aug. 6, 2014; 6 pages. http://www.netmanias.com/en/post/blog/6551/lte-lte-a-eicic/interference-coordination-in-lte-lte-a-2-eicic-enhanced-icic.

(56) References Cited

OTHER PUBLICATIONS

Droms, R., "Dynamic Host Configuration Protocol," Network Working Group RFC 2131, Mar. 1997; 45 pages.
"E Band," from Wikipedia, the free encyclopedia, Dec. 24, 2013; 3 pages.
"EEM Configuration for Cisco Integrated Services Router Platforms," Configuration Guide for Cisco IOS® Embedded Event Manager (EEM), Cisco Systems, Inc., Feb. 2008; 17 pages.
"Extensible Authentication Protocol," Wikipedia, the free encyclopedia, 10 pages [Retrieved and printed Oct. 11, 2013] http://en.wikipedia.org/wiki/Extensible_Authentication_Protocol#Eap-Fast.
Ericsson, "R4-153549: Agenda Item 7.9.3.1—SFN and subframe offset reporting for dual connectivity," 3GPP TSG RAN WG4 Meeting #75, Fukuoka, Japan, May 25-29, 2015.
Ericsson, et al., "LPN Range Expansion in Co-Channel Deployment in Heterogeneous Networks," 3GPP Draft R1-125219, , 3rd Generation Partnership Project (3GPP), Mobile Competence Centre; 650; Route Des Lucioles; F-06921 Sophia-Antipolis; Nov. 2012, 7pages.
Ericsson, et al., "On the Feasibility of Operational Carrier Selection," 3GPP Draft R3-112991 , 3rd Generation Partnership Project (3GPP), Mobile Competence Centre; 650; Route Des Lucioles; F-06921 Sophia-Antipolis; Nov. 2011, 7 pages.
"Fading," from Wikipedia, the free encyclopedia, Apr. 10, 2015; 6 pages.
"Frame Structure—Downlink," Share Tech note, first published on or about Jul. 9, 2012; 13 pages http://www.sharetechnote.com/html/FrameStructure_DL_html.
"Fuzzy Logic," from Wikipedia, the free encyclopedia, Dec. 3, 2015; 12 pages.
Freescale Semiconductor, "Long Term Evolution Protocol Overview," White Paper, Document No. LTEPTCLOVWWP, Oct. 2008; 21 pages.
Goldsmith, A.J., et al., "Variable Rate Variable-Power MQAM for Fading Channels," IEEE Trans. on Comm. vol. 45, No. 10, Oct. 1997.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Holappa, Mikko, "Performance Comparison of LTE ENODEB OSI Layer 2 Implementations; Preemptive Partitioned Scheduling vs. Non-Preemptive Global Scheduling," Master's Thesis, Degree Programme in Information Networks; Oulun Ylipoisto , University of OULU Department of Computer Science and Engineering; Oct. 2013, 66 pages.
Holbrook, H., et al., "Source-Specific-Multicast for IP," Network Working Group RFC 4607, Aug. 2006.
Horn, Gavin, "3GPP Femtocells: Architecture and Protocols," Qualcomm Incorporated, 5775 Morehouse Drive, San Diego, CA, Sep. 2010; 64 pages.
"Hysteresis," from Wikipedia, the free encyclopedia; Oct. 1, 2015.
"Hybrid Automatic Repeat Request," from Wikipedia, the free encyclopedia, Jun. 8, 2015; 4 pages.
Ku, Gwanmo, "Resource Allocation in LTE," Adaptive Signal Processing and Information Theory Research Group, Nov. 11, 2011; 33 pages.
Kwan, R., et al., "A Survey of Scheduling and Interference Mitigation in LTE," vol. 2010, Article ID 273486, May 30, 2010.
Kwan, R., et al., "On Radio Admission Control for LTE Systems," Proc. of IEEE VTC-fail, Sep. 6-9, 2010.
Leung, K., et al., "WiMAX Forum/3GPP2 Proxy Mobile IPv4," Independent Submission RFC 5563, Feb. 2010; 41 pages.
Lopez-Perez, D., et al., "Interference Avoidance and Dynamic Frequency Planning for WiMAX Femtocells Networks," Proceedings of ICCS, Jun. 23-25, 2008.
LteWorld, "Packet Data Convergence Protocol (PDCP)," Information Page, LteWorld.org, published on or about Jan. 2, 2013; 2 pages.
"Link Layer Discovery Protocol," Wikipedia, the free encyclopedia, 4 pages, [Retrieved and printed Nov. 17, 2013] http://en.wikipedia.org/wiki/Link_Layer_Discovery_Protocol.
"LTE Physical Layer Overview," Keysight Technologies, First published on or about Aug. 24, 2014; 11 pages http://rfmw.em.keysight.com/wireless/helpfiles/89600B/webhelp/subsystems/lte/content/lte_overview.htm.
"LTE Frame and Subframe Structure," Cellular/Mobile Telecommunications, Tutorial, Radio-Electronics.com; first oublished on or about Aug. 6, 2009 http://www.radio-electronics.com/info/cellulartelecomms/lte-long-term-evolution/lte-frame-subframe-structure.php.
"LTE Layers Data Flow," LTE Tutorial, tutorialspoint; first published on or about Jan. 17, 2013; 3 pages http://www.tutorialspoint.com/lte/lte_layers_data_flow.htm.
"LTE Protocol Stack Layers," LTE Tutorial, tutorialspoint; first published on or about Jan. 16, 2013 http://www.tutorialspoint.com/lte/lte_protocol_stack_layers.htm.
"LTE Quick Reference," from Share Technote; first published on or about Nov. 28, 2012; http://www.sharetechnote.com/html/Handbook_LTE_RNTI.html.
"LTE Quick Reference: CCE Index Calculation," LTE Handbook, Share Technote, first published on or about Jul. 8, 2012 http://www.sharetechnote.com/html/Handbook_LTE_CCE_Index.html.
"LTE Quick Reference: Resource Allocation and Management Unit," LTE Handbook, Share Technote, first published on or about Jul. 13, 2012 http://www.sharetechnote.com/html/Handbook_LTE_ResourceAllocation_ManagementUnit.html.
"LTE TDD Overview," from ShareTechnote; first published on or about Jul. 2, 2014 http://www.sharetechnote.com/html/LTE_TDD_Overview.html.
Mehlfuhrer, M., et al., "Simulating the Long Term Evolution Physical Layer," Proc. of 17th European Signal Processing Conference (EUSOPCO), Aug. 24-28, 2009.
Narten T., et al., "Neighbor Discovery for IP version 6 (IPv6)," Network Working Group RFC 4861, Sep. 2007; 97 pages.
NGMN Alliance, "Further Study on Critical C-RAN Technologies," Next Generation Mobile Networks, Mar. 31, 2015; 93 pages.
Nivaggioli, Patrice, "Cisco Small Cell Architecture," Cisco Connect, Dubrovnik, Croatia, South East Europe, May 20-22, 2013, ©2012 Cisco and/or its affiliates. All Rights Reserved.; 40 pages.
Nokia Corporation, et al., "SON WI Status Overview," 3GPP Draft R2-093231, 3rd Generation Partnership Project (3GPP), Mobile Competence Centre; 650; Route Des Lucioles; F-06921 Sophia-Antipolis; Apr. 2009.
Novlan, Thomas David, et al., "Analytical Evaluation of Fractional Frequency Reuse for OFDMA Cellular Networks," arXiv: 1101.5130v1 [cs.IT]; arXiv.org, Cornell University Library; Jan. 26, 2011, 25 pages.
Okubo, Naoto, et al., "Overview of LTE Radio Interface and Radio Network Architecture for High Speed, High Capacity and Low Latency," Special Articles on "Xi" (Crossy) LTE Services—Toward Smart Innovation—Technology Reports; NTT DOCOMO Technical Journal vol. 13 No. 1, Jun. 2011.
"Paging Channel Selection," UMTS World; first published on or about Jun. 22, 2003; 3 pages; http://www.umtsworld.com/technology/paging.html.
"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"PDCCH Processing," published by Gio Zakradze on Dec. 29, 2014; 56 pages.
"plane (in networking)," Definition from WhatIs.com; Jan. 2013 http://whatis.techtarget.com/definition/plane-in-networking.

(56) References Cited

OTHER PUBLICATIONS

Piro, G., et al., "An LTE module for the ns-3 Network Simulator," in Proc. of Wns3 2011 (in conjunction with SimuTOOLS 2011), Mar. 2011, Barcelona Spain.

Qualcomm Incorporation: "Design Objectives and Deployment Scenarios for Hetnets," 3GPP Draft R1-124528, 3rd Generation Partnership Project (3GPP), Mobile Competence Centre; 650; Route Des Lucioles; F-06921 Sophia-Antipolis; Sep. 2012, XP050662404.

"Quadrature amplitude modulation," from Wikipedia, the free encyclopedia, Apr. 22, 2015; 11 pages.

"QoS Class Identifier," from Wikipedia, the free encyclopedia, Oct. 7, 2015.

"Radius," Wikipedia, the free encyclopedia, 12 pages [Retrieved and printed Oct. 11, 2013] http://en.wikipedia.org/wiki/Radius.

"RSRP, EPRE, Total Power," LTE Quick Reference from Sharetechnote.com; first published on or about Aug. 3, 2014; http://www.sharetechnote.com/html/Handbook_LTE_RSRP_EPRE_TotalPower.html.

Saad, Sawsan A., et al., "A Survey on Power Control Techniques in Femtocell Networks," Journal of Communications vol. 8, No. 12, Dec. 2013; 10 pages.

Sadiq, Bilal, et al., "Throughput Optimality of Delay-driven Max Weight Scheduler for a Wireless System with Flow Dynamics," 47th Annual Allerton Conference, Sep. 30-Oct. 2, 2009, University of Illinois at Urbana-Champaign, Champaign, Illinois; 6 pages.

Salim, Umer, et al., "State-of-the-art of and promising candidates for PHY layer approaches on access and backhaul network," INFSO-ICT-317941 iJOIN D 2.1, iJOIN GA, Nov. 4, 2013; 129 pages.

Seo, H., et al., "A proportional-fair power allocation scheme for fair and efficient multiuser OFDM systems," in Proc. of IEEE GLOBECOM, Dec. 2004, Dallas (USA).

Stefan Schwarz Etal: "Low complexity approximate maximum throughput scheduling for LTE," 2010 44th Asilomar Conference on Signals, Systems and Computers, Nov. 7-10, 2010, XP031860825, DOI:10.1109/ACSSC.2010.5757800I5BN:978-1-4244-9722-5 p. 1563-p. 1565.

Stolyar A.L., et al., "Self-Organizing Dynamic Fractional Frequency Reuse for Best-Effort Traffic through Distributed Inter-Cell Coordination," IEEE INFOCOM 2009, Proceedings of 28th Conference on Computer Communications, Apr. 12, 2009, pp. 1287-1295, XP031468882, ISBN:978-1-4244-3512-8.

Tassiulas, L., et al., "Stability Properties of Constrained Queueing Systems and Scheduling Policies for Maximum Trhoughput in Multihop Radio Networks," Technical Research Report,CSHCN TR 92-3/ISR TR 92-129, Center for Satellite & Hybrid Communication Networks, A NASA Center for the Commercial Development of Space; University of Maryland Institute for Systems Research; Published in IEEE Transactions on Automatic Control, vol. 37, No. 12, Dec. 1992; 14 pages.

"Transmission Time Interval," from Wikipedia, the free encyclopedia, May 2, 2013.

UKIPO Mar. 27, 2012 Search Report from GB Patent Application Serial No. GB1120462.5.

UKIPO Jan. 19, 2013 Search Report from GB Patent Application Serial No. GB1120462.5.

UKIPO Dec. 20, 2013 Search Report from GB Application Serial No. GB1312321.1, 6 pages.

Velasco, Julio C., et al., "MEF Microwave Technologies for Carrier Ethernet," Metro Ethernet Forum (MEF), 6033 W. Century Boulevard, Suite 1107, Los Angeles CA 90045 USA Jan. 2011; 23 pages.

Wanda, Alex, "UMTS UTRAN Block Error Rate (BLER) Measurements," Telecom Insights, Jan. 2011; 3 pages http://trends-in-telecoms.blogspot.com/2011/01/umts-utrans-block-error-rate-rate-bler.html.

Weaver, Carl, "Self-Organizing Mobility Robustness Optimization in LTE Networks with eICIC," Draft V5.0, Submitted Oct. 23, 2013, Cornell University Library, 19 pages http://arxiv.org/abs/1310.6173.

"Whats is Uplink RSSI in LTE," TelecomSource thread, May 22, 2013; 5 pages http://www.telecomsource.net/howthread.php?5464-Whats-is-Uplink-RSSI-in-LTE.

Wubben, Dirk, et al., "Benefits and Impact of Cloud Computing on 5G Signal Processing," IEEE Signal Processing Magazine, Nov. 2014.

EPO Jul. 29, 2014 Extended Search Report from European Application Serial No. EP13195673, 12 pages.

EPO Aug. 12, 2014 Extended EPO Search Report and Opinion from European Application Serial No. 13195780.8.

EPO Nov. 19, 2015 Extended Search Report and Written Opinion from European Application EP13767700; 9 pages.

EPO Mar. 26, 2015 Extended Search Report and Opinion from European Application Serial No. EP14190541.

PCT Jul. 16, 2013 International Search Report and Written Opinion from International Application PCT/IL2013/050269, 3 pages.

PCT Oct. 1, 2014 International Preliminary Report on Patentability from International Application PCT/IL2013/050269, 4 pages.

PCT Mar. 17, 2014 International Search Report and Written Opinion from International Application Serial No. PCT/IL2013/000086, 12 pages.

PCT Mar. 16, 2014 International Search Report and Written Opinion of the International Searching Authority for International Application Serial No. PCT/IL2013/000085.

PCT-Feb. 13, 2013 International Search Report and Written Opinion from International Application PCT/GB2012/052511; 28 pages.

EPO Jan. 27, 2016 Extended Search Report and Written Opinion from European Application Serial No. 15183582.4; 6 pages.

Sabella, Dario, et al., "RAN as a Service: Challenges of Designing a Flexible RAN Architecture in a Cloud-based Heterogeneous Mobile Network," Future Network Summit Conference, Lisbon, Portugal, Jul. 3-5, 2013; 8 pages.

"ETSI TS 128 657 V11.0.0 (Feb. 2013) Technical Specification: Universal Mobile Telecommunications System 9UMTS); LTE; Telecommunication management; Evolved Universal Terrestrial Radio Access Network 9E-UTRAN) Network Resource Model (NRM); Integration Reference Point (IRP); Requirements (3GPP TS 28.657 version 11.0.0 Release 11)," ETSI, European Telecommunications Standards Institute 2012, 650 Route des Lucioles, F-06921 Sophia Antipolis Cedex—France, Feb. 2013; 9 pages.

"ETSI TS 128 658 V11.0.0 (Feb. 2013) Technical Specification: Universal Mobile Telecommunications System 9UMTS); LTE; Telecommunication management; Evolved Universal Terrestrial Radio Access Network (E-UTRAN) Network Resource Model (NRM) Integration Reference Point (IRP); Information Service (IS) (3GPP TS 28.658 version 11.0.0 Release 11)," ETSI, European Telecommunications Standards Institute 2012, 650 Route des Lucioles, F-06921 Sophia Antipolis Cedex—France, Feb. 2013; 53 pages.

"ETSI TS 128 659 V11.0.0 (Jan. 2013) Technical Specification: Universal Mobile Telecommunications Systems (UMTS); LTE; Telecommunications Management; Evolved Universal Terrestrial Radio Access Network (E-UTRAN) Network Resource Model (NRM) Integration Reference Point (IRP); Solution Set (SS) definitions (3GPP TS 28.659 version 11.0.0 Release 11)," ETSI, European Telecommunications Standards Institute 2012, 650 Route des Lucioles, F-06921 Sophia Antipolis Cedex—France, Jan. 2013; 48 pages.

"ETSI TS 136 300 V10.2.0 (Jan. 2011) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10)," ETSI, European Telecommunications Standards Institute 2012, 650 Route des Lucioles, F-06921 Sophia Antipolis Cedex—France, Jan. 2011; 208 pages.

"ETSI TS 136 423 V11.3.0 (Jan. 2013) Technical Specification: LTE; Evolved Universal Terrestrial Radio Access Network (E-UTRAN); X2 Application Protocol (X2AP) (3GPP TS 36.423 version 11.3.0 Release 11)," ETSI, European Telecommunications Standards Institute 2012, 650 Route des Lucioles, F-06921 Sophia Antipolis Cedex—France, Jan. 2013; 143 pages.

(56) References Cited

OTHER PUBLICATIONS

Chauhan, Himanshu, "UE Measurements and Reporting in UMTS," Wireless Technologies, Blog dated Apr. 26, 2013; 3 pages http://worldtechieumts.blogspot.com/2013/04/ue-measurements-and-reporting-in-umts.html.
Ghaffar, Rizwan, et al., "Fractional Frequency Reuse and Interference Suppression for OFDMA Networks," published in "WiOpt"10: Modeling and Optimization in Mobile, Ad Hoc, and Wireless Networks (2010), Jul. 19, 2010, 5 pages.
La Rocca, Maurizio, "RSRP and RSRQ Measurement in LTE," Iaroccasolutions Technology & Services, Feb. 2, 2015; 9 pages http://www.laroccasolutions.com/training/78-rsrp-and-rsrq-measurement-in-lte.
Madan, Ritesh, et al., "Fast Algorithms for Resource Allocation in Wireless Cellular Networks," IEEE/ACM Transactions on Networking, vol. 18, No. 3, Jun. 2010; 12 pages.
Park, Jeongho, et al., "Interference Level Control in Mobile WiMAX Uplink System," 2009 IEEE Mobile WiMAX Symposium, Jul. 9-10, 2009; 5 pages.
"Received signal strength indication," Wikipedia, the free encyclopedia, Dec. 22, 2014; 2 pages.
Rengarajan, Balaji, "A Semi-autonomous Algorithm for Self-organizing Dynamic Fractional Frequency Reuse on the Uplink of OFDMA Systems," Dec. 14, 2009; 22 pages.
Ruby, Ruksana, et al., "Uplink Scheduling Solution for Enhancing Throughput and Fairness in Relayed Long-Term Evolution Networks," IET Communications 2014, vol. 8, Issue 6, Apr. 2014; 13 pages.
Tayal, Nitin, "All About PDCCH and CCE Allocation," Tayal's Way to Learn LTE, Tutorial Blog dated May 2013, 14 pages. http://nitintayal-lte-tutorials.blogspot.com/2013/05/all-about-pdcch-and-cce-allocation.html.
Thapa, Chandra, et al., "Comparative Evaluation of Fractional Frequency Reuse (FFR) and Traditional Frequency Reuse in 3GPP-LTE Downlink," International Journal of Mobile Netework Communications & Telematics (IJMNCT) vol. 2, No. 4, Aug. 2012; 8 pages.
Wang, Jiao, "Dynamic Centralized Interference Coordination in Femto Cell Network with QoS Provision," Latest Trends on Communications, Proceedings of the 18th International Conference on Communications (Part of CSCC '14), Jul. 17-21, 2014; 6 pages.
Xiong, Chao, "Enhanced ICIC for LTE-A HetNet," ZTE Corporation, LTE World Summit 2012, May 2012; 3 pages.
Zyren, Jim, "Overview of the 3GPP Long Term Evolution Physical Layer," White Paper, Freescale Semiconductor, Document Number: 3GPPEVOLUTIONWP; Jul. 2007; 27 pages.
PCT Mar. 27, 2014 International Search Report and Written Opinion from International Application PCT/IL2013/000080, 10 pages.
PCT Apr. 28, 2015 International Preliminary Report on Patentability and Written Opinion from International Application PCT/IL2013/000080.
ILPO May 13, 2015 Search Report from Israel Application Serial No. IL222709 [Only partially translated].
Nokia Siemens Networks et al: "Enhanced ICIC considerations for HetNet scenarios", 3GPP Draft; R1-103822_EICIC_OVERVIEW, 3RD Generation Partnership Project (3GPP), Mobile Competence Centre; 650, Route Des Lucioles; F-06921 Sophia-Anti Polis Cedex; France, vol. RAN WG1, No. Dresden, Germany; 20100628—20100702, Jun. 22, 2010 (Jun. 22, 2010), XP050598481, [retrieved on Jun. 22, 2010] Section 3, 4 pages.
Qualcomm Incorporated: "Introduction of enhanced ICIC", 3GPP Draft; R2-106246, 3rd Generation Partnership Project (3GPP), Mobile Competence Center; 650, Route Des Lucioles; F-06921 Sophia-Anti Polis Cedex; France, vol. Ran WG2, No. Jacksonville, USA; 20101115, Nov. 9, 2010 (Nov. 9, 2010), XP050492195, [retrieved on Nov. 9, 2010] Section 16.X.2, 5 pages.
"3GPP TS 36.300 V9.7.0 (Mar. 2011) Technical Specification: $3^{rd}$ Generation Partnership Project; Technical Specification Group Radio Access Network; Evolved Universal Terrestrial Radio access (E-UTRA) and Evolved Universal Terrestrial Radio Access Network (E-UTRAN); Overall description; Stage 2 (Release 9)," 3GPP, 650 Route des Lucioles—Sophia Antipolis Valbonne—France, Mar. 2011; 173 pages.
U.S. Appl. No. 15,089,252, filed Apr. 1, 2016, entitled "Method and System for Dynamic Allocation of Resources in a Cellular Network,".
U.S. Appl. No. 15/071,724, filed Mar. 16, 2016, entitled "Power Setting," Inventor: Pankaj Uplenchwar, et al.
U.S. Appl. No. 14/479,343, filed Sep. 7, 2014, entitled "Operation of Base Station in a Celllular Communication Network, " Inventor: Simon Burley.
U.S. Appl. No. 15/015,691, filed Feb. 4, 2016, entitled "System and Method for Optimizing Performance of a Communication Network," Inventor(s): Ziv Nuss, et al.
U.S. Appl. No. 14/818,084, filed Aug. 4, 2015 entitled "Resource Adaptation for Frequency Domain Downlink Inter-Cell Interference Coordination," Inventors: Ritesh K. Madan et al.
U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.
U.S. Appl. No. 14/811,580, filed Jul. 28, 2015 entitled "Determining Fractional Frequency Reuse Power Levels for Downlink Transmissions," Inventor: Ritesh K. Madan.
U.S. Appl. No. 14/816,957, filed Aug. 3, 2015 entitled "Selecting Cells for Downlink Inter-Cell Interference Coordination," Inventors: Rohit U. Nabar et al.
U.S. Appl. No. 14/816,990, filed Aug. 3, 2015 entitled "User Equipment Power Level Selection for Downlink Transmissions," Inventors: Vikram Chandrasekhar et al.
U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.
U.S. Appl. No. 14/686,598, filed Apr. 14, 2015, entitled "System and Method for Providing Uplink Inter Cell Interference Coordination in a Network Environment," Inventors: Ritesh K. Madan, et al.
U.S. Appl. No. 14/691,260, filed Apr. 20, 2015, entitled "System and Method for Providing Uplink Inter Cell Interference Coordination in a Network Environment," Inventors: Ritesh K. Madan, et al.
U.S. Appl. No. 14/809,201, filed Jul. 25, 2015, entitled "System and Method to Facilitate Small Cell Uplink Power Control in a Network Environment," Inventors: Ritesh K. Madan, et al.
U.S. Appl. No. 14/833,519, filed Aug. 24, 2015, entitled "System and Method to Facilitate Small Cell Uplink Powercontrol in a Network Environment," Inventors: Ritesh K. Madan, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.
U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 14/961,552, filed Dec. 7, 2015, entitled "System and Method to Provide Uplink Interference Coordination in a Network Environment," Inventor: Ritesh K. Madan.
U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.
U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.
U.S. Appl. No. 15/018,677, filed Febuary 8, 2016, entitled "Mitigation of Uplink Interference Within Heterogeneous Wireless Communications Networks," Inventor: Pankaj Uplenchwar, et al.

(56) References Cited

OTHER PUBLICATIONS

EPO Nov. 21, 2016 Extended Search Report and Written Opinion from European Application Serial No. 16180195.6; 9 pages.
Liu, Jianquo, et al., "Uplink Power Control and Interference Foordination for Heterogeneous Network," 2012 IEEE 23rd International Symposium on Personal, Indoor and mobile Radio Communications, Sydney, Australia, Sep. 9-12, 2012; 5 pages.
IPO Mar. 27, 2017 Intellectual Property Office Combined Search and Examination Report under Sections 17 and 18(3) from Application No. GB1703805.0; 5 pages.
PRC Apr. 7, 2017 SIPO First Office Action from Chinese Application No. 201280058324.X; 14 pages (English translation only).
U.S. Appl. No. 15/251,471, filed Aug. 30, 2016, entitled "Method and Apparatus for Reducing Inter-Cell Interference," Inventor: Ziv Nuss, et al.
U.S. Appl. No. 14/801,381, filed Jul. 16, 2015, entitled "System and Method to Manage Network Utilization According to Wireless Backhaul and Radio Access Network Conditions," Inventor: Ishwardutt Parulkar.

* cited by examiner

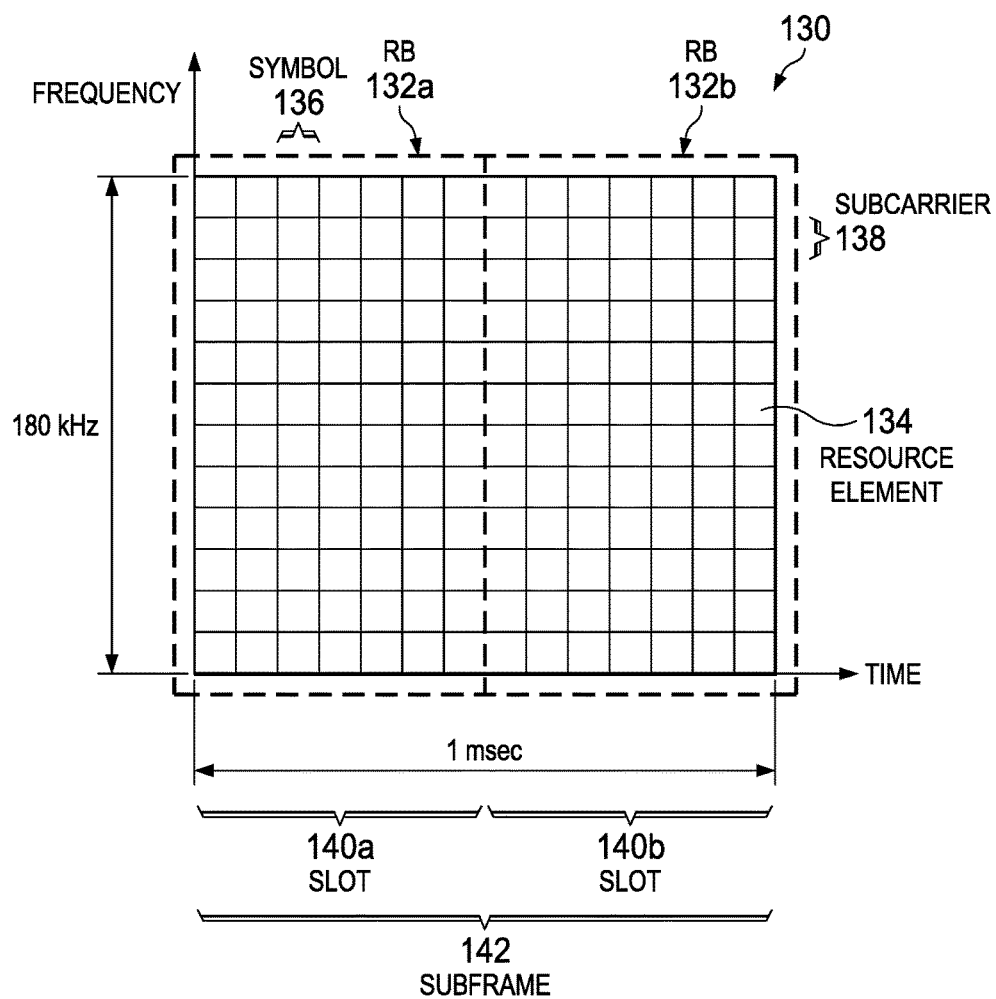

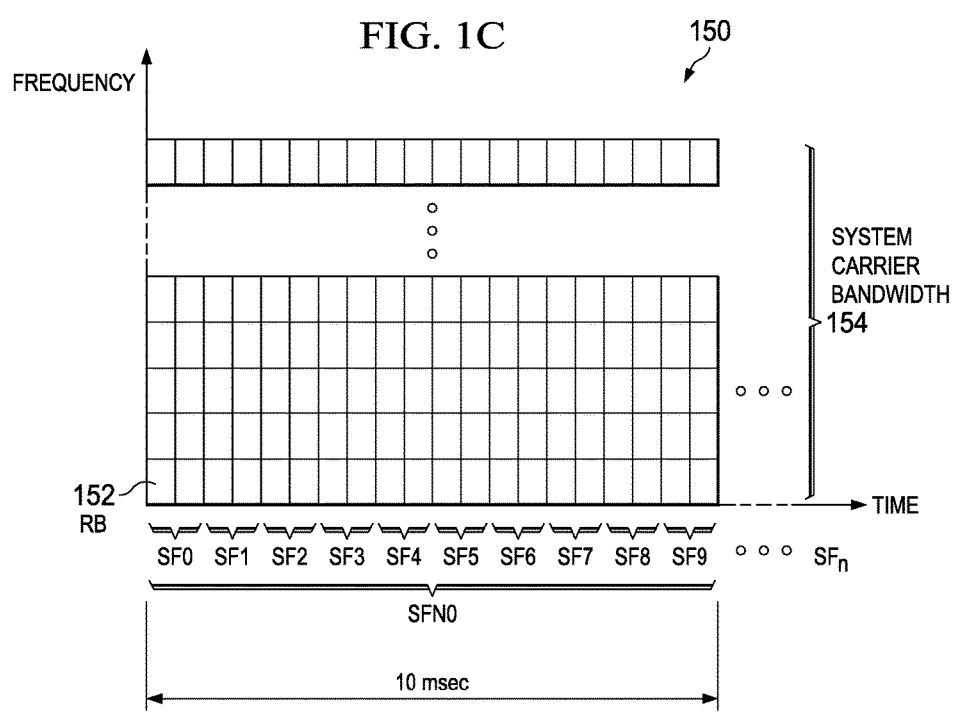

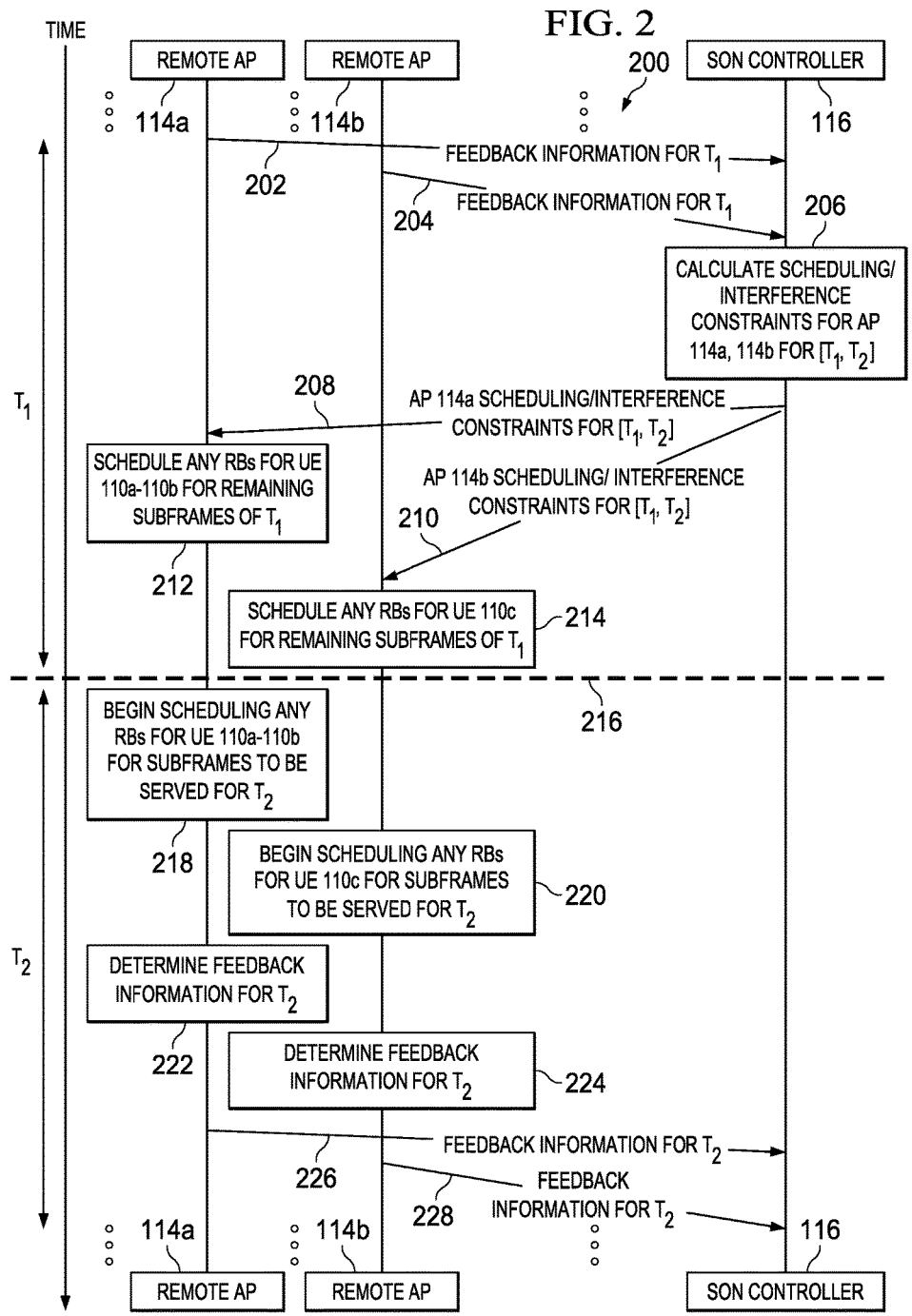

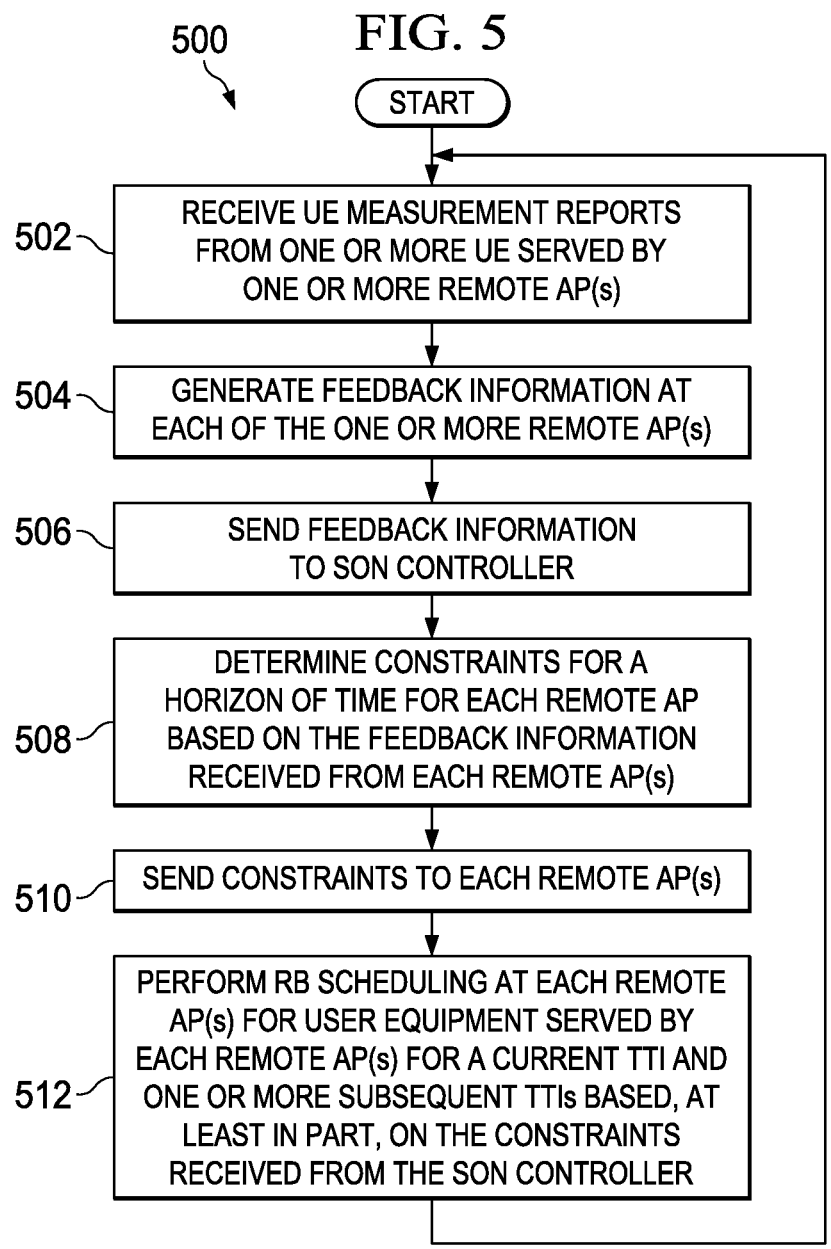

SYSTEM AND METHOD TO FACILITATE CENTRALIZED RADIO RESOURCE MANAGEMENT IN A SPLIT RADIO ACCESS NETWORK ENVIRONMENT

TECHNICAL FIELD

This disclosure relates in general to the field of communications and, more particularly, to a system and method to facilitate centralized Radio Resource Management (RRM) in a split Radio Access Network (RAN) environment.

BACKGROUND

Networking architectures have grown increasingly complex in communication environments. Mobile communication networks have grown substantially in subscriber base as end users become increasingly connected to mobile wireless environments. As the number of mobile subscribers, increases, efficient management of communication network resources becomes more critical. In some instances, network service providers desire to centralize access control, mobility control and/or load control to manage communication network resources. However, there are significant challenges in centralizing control of communication network resources, particularly with regard to timing constraints for radio resource management for user equipment within a communication network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 1B-1C are simplified schematic diagrams illustrating example details that can be associated with the communication system in accordance with various potential embodiments;

FIG. 2 is a simplified schematic diagram illustrating example signaling interactions and operations that can be associated with providing centralized RRM in accordance with one potential embodiment of the communication system;

FIG. 5 is a simplified flow diagram illustrating example operations that can be associated with providing centralized RRM in a split RAN environment in accordance with one potential embodiment of the communication system.

DETAILED DESCRIPTION OF EXAMPLE EMBODIMENTS

Overview

Figure 1A:
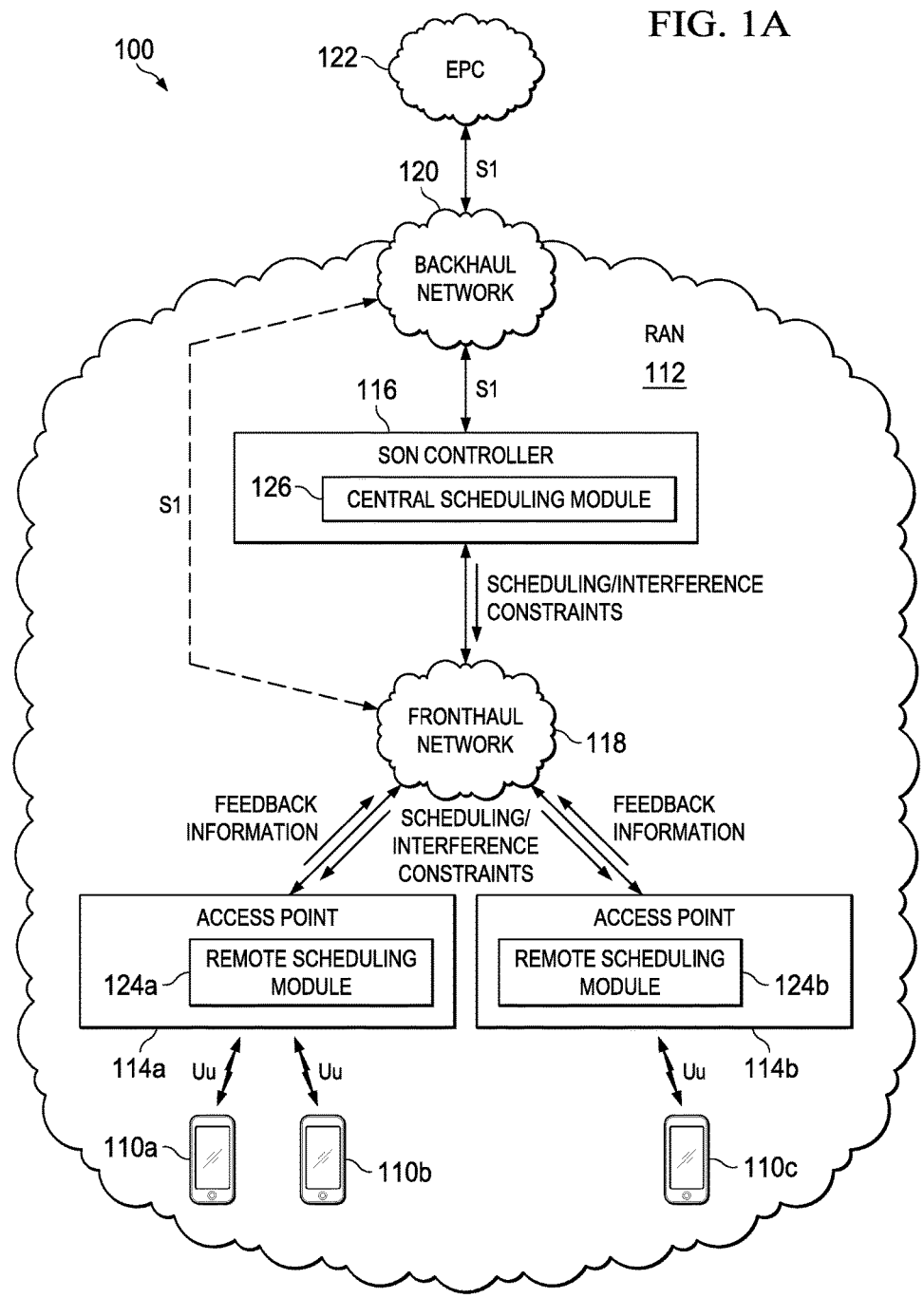
FIG. 1A is a simplified block diagram illustrating a communication system to facilitate providing centralized RRM in a split RAN environment according to one embodiment of the present disclosure.

A method is provided in one example embodiment and includes generating feedback information at a first remote access point (AP), wherein the feedback information is associated with one or more user equipment served by the first remote AP; determining constraints for the first remote AP at a central controller based on the feedback information received from the first remote AP and feedback information received from one or more other remote APs that neighbor the first remote AP, wherein the constraints are determined for a plurality of transmission time intervals (TTIs); and scheduling resource blocks (RBs) for the one or more user equipment served by the first remote AP for one or more of the plurality of TTIs based, at least in part, on constraints received from the central controller.

In one instance, the constraints can be scheduling and interference constraints associated with one or more interference levels that the first remote AP can expect, on average, as a function of frequency. In another instance, the constraints can be scheduling and interference constraints associated with one or more interference levels that the first remote AP can expect, on average, as a function of frequency and time. In yet another instance, the constraints can be scheduling and interference constraints associated with one or more maximum interference level(s) that the first remote AP and the one or more user equipment served by the first remote AP can cause toward the one or more other remote APs as a function of frequency. In yet another instance, the constraints can be scheduling and interference constraints associated with one or more maximum interference level(s) that the first remote AP and the one or more user equipment served by the first remote AP can cause toward the one or more other remote APs as a function of frequency and time.

In one case, scheduling RBs for the user equipment served by the first remote AP for one or more of the plurality of TTIs can include determining local scheduling information available at the first remote AP; and scheduling RBs for any user equipment served by the first remote AP using the local scheduling information available at the first remote AP and the constraints. In one instance, the local scheduling information available at the first remote AP can include one or more of: Hybrid Automatic Repeat Request (HARQ) information associated with the one or more user equipment served by the first remote AP; a per user equipment Channel Quality Indicator (CQI) associated with each of the one or more user equipment served by the first remote AP; and per user equipment bearer packet information associated with each of the of the one or more user equipment served by the first remote AP.

In one instance, the feedback information can include one or more of: estimated queue state information associated with one or more queues maintained by the first remote AP for one or more user equipment bearers; estimated delay information associated with each of the one or more queues maintained by the first remote AP; and channel state information associated with the one or more user equipment for the first remote AP the one or more other remote APs.

Example Embodiments

As referred to herein in this Specification, the terms 'virtual machine', 'virtualized network function' and 'virtualized network functionality' can encompass an emulation of a computer system and/or computing platform operating based on the computer architecture and functions of a real or hypothetical computer, with particular embodiments involving specialized hardware, software, or a combination of both. In various embodiments, a virtualized network function (VNF), a virtual machine (VM), a virtualized network function component (VNFC), virtualized functionality and/or any virtualized network controller, module, aggregator, combinations thereof or the like as described herein may execute via a hypervisor-based virtualization or a container-based virtualization of a server (e.g., blade server, rack server, stand-alone server) using the server's hardware (e.g., processor and memory element) and/or operating system for a given virtualized network environment.

In some cases, VNF(s) can be configured to perform one or more specialized operations within a network environment and one or more instances of the configured VNF(s) can be instantiated in order to execute the one or more specialized operations. In some instances, VNF(s) can include one of more virtualized network function components (VNFCs). A VNFC can be an internal component of a VNF, which can provide a VNF provider a defined subset of that VNF's functionality. In some embodiments, operations associated with a RAN can be configured to be executed via one or more VNFs and/or VNFCs and one or more Physical Network Functions (PNFs) to realize a virtualized RAN (vRAN) architecture. A PNF is typically associated with a hardware radio head, which can be configured with one or more transmitters and receivers (and other associated hardware and software functionality) in order to facilitate over-the-air (OTA) Radio Frequency (RF) communication links with one or more user equipment (UE).

Different logical separations of VNFs can be configured for different possible vRAN architectures. For a given vRAN architecture, each configured VNF/VNFC or type of VNF/VNFC can perform certain specialized operations among one or more virtualized network controller(s), module(s), aggregator(s), combinations thereof or any other network element that may be associated with the vRAN architecture. A given vRAN architecture can be realized, in an operational sense, by instantiating VNFs and/or VNFCs associated with the vRAN architecture at runtime, power-up, initialization, dynamically based on load, etc. for one or more servers, etc. in order to execute the specialized operations as configured for the VNFs and/or VNFCs.

Turning to FIG. 1A, FIG. 1A is a simplified block diagram illustrating a communication system 100 to facilitate sub-frame scheduling in a split RAN environment according to one embodiment of the present disclosure. The particular configuration illustrated in FIG. 1A may be tied to the 3rd Generation Partnership Project (3GPP) Evolved Universal Mobile Telecommunications System (UMTS) Terrestrial Radio Access Network (E-UTRAN) architecture, generally referred to as 4G/LTE, which can interface with a Long Term Evolution (LTE) Evolved Packet System (EPS) core. The EPS core is typically referred to as the Evolved Packet Core (EPC). Alternatively, the depicted architecture may be applicable to other environments equally. In one example, the architecture may be equally applicable to a vRAN architecture in which RAN functionality can be provided via one or more VNFs, one or more VNFCs and/or one or more PNFs.

The term 'fronthaul' is used herein in this Specification to describe interface(s) provided via a fronthaul network that interconnect network elements of any RAN architecture, non-virtualized or virtualized. The term 'backhaul' is used herein in this Specification to describe interface(s) provided via a backhaul network that interconnect network elements of any RAN architecture, non-virtualized or virtualized, to network elements of an EPC. As referred to herein in this Specification, the term 'plane' can refer to a separation of traffic that can traverse a network. Three planes can typically be found in communication networks including: a data plane, a control plane and a management plane. The data plane typically carries user traffic, while the control plane typically carries signaling traffic used to provide routing information for user traffic and the management plane, a subset of the control plane, typically carries administrative traffic. As referred to herein in this Specification, the terms 'user plane', 'data plane' and 'user data plane' can be used interchangeably.

The example architecture of FIG. 1A for communication system 100 includes users operating user equipment (UE) 110a-110c, a Radio Access Network (RAN) 112, remote Access Points (APs) 114a-114b and a Self-Organizing Network (SON) controller 116. SON controller 116 can include a Central Scheduling Module (CSM) 126. Remote AP 114a can include a Remote Scheduling Module (RSM) 124a and remote AP 114b can include an RSM 124b. As referred to herein in this Specification, a remote AP can also be referred to interchangeably as a 'Remote Radio Unit' (RRU), a 'femtocell AP' (FAP), a 'small cell AP', a 'small cell', a 'macro cell' or the like.

A fronthaul network 118 may provide infrastructure to provide at least one differentiated, secure, reliable and manageable communication channel, which facilitates interconnections between remote APs 114a-114b and SON controller 116. A backhaul network 120 may provide infrastructure to provide at least one differentiated, secure, reliable and manageable communication channel, which facilitates interconnections between SON controller 116 and an EPC 122 via an S1 interface, as defined by 3GPP standards. In at least one embodiment, the S1 interface can include an S1-U interface portion for user data plane traffic exchanged with one or more elements of EPC 122 and can include an S1-MME interface portion for control plane signaling exchanges with one or more elements of EPC 122. In various embodiments, infrastructure can include, but not be limited to: network elements such as routers, switches, gateways, etc.; communication links (wired or wireless); interfaces to facilitate user and control plane exchanges according to one or more signaling protocols; combinations thereof or the like. In at least one embodiment, remote APs 114a-114b can communicate with one or more elements of the EPC via an S1 interface provided via backhaul network 120 and fronthaul network 118.

In general, RAN 112 may provide a communications interface between UE 110a-110c and EPC 122. In various embodiments, RAN 112 may include access networks such as a Global System for Mobile Communications (GSM) Enhanced Data Rates for GSM (EDGE) radio access network (GERAN), generally referred to as 2G, a Universal Mobile Telecommunications System (UMTS) Terrestrial radio access network (UTRAN), generally referred to as 3G, and/or a LTE access network such as evolved UTRAN (E-UTRAN), generally referred to as 4G or LTE/LTE-Advanced (LTE-A).

Each of the elements of FIG. 1 may couple to one another through the simple interfaces (as illustrated) or through any other suitable connection (wired or wireless), which provides a viable pathway for network communications. Additionally, any one or more of these elements may be combined or removed from the architecture based on particular configuration needs. In some embodiments, communications in a network environment can be facilitated through the exchange of packets. A packet is a formatted unit of data and can contain both control information (e.g., source and destination address, etc.) and data, which is also known as payload. Network traffic can be sent and received according to any suitable communication messaging protocols. Suitable communication messaging protocols can include a multi-layered scheme such as the OSI Model, or any derivations or variants thereof. For example, communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

Other protocols or interfaces that can be used in communication system 100 can include 3GPP DIAMETER-based protocols, a remote authentication dial in user service (RADIUS) protocol, a service gateway interface (SGi), a terminal access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP), Generic Route Encapsulation (GRE), etc. The terms 'data' and 'information' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In various embodiments, EPC 122 can include one or more Mobility Management Entities (MMES), one or more serving gateways (SGWs), one or more Packet Data Network (PDN) gateways (PGWs), etc., as defined in 3GPP standards for 4G/LTE access networks, to facilitate the exchange of data to and from one or more external PDNs, such as, for example, the Internet, one or more operator IP services (e.g., Voice over LTE (VoLTE)) for UE 110a-110c. EPC 122 may include other elements such as one or more Policy and Charging Rules Functions (PCRFs), one or more Authentication, Authorization and Accounting (AAA) elements, a Home Subscriber Server/Home Location Register (HSS/HLR), etc. to provide connectivity for UE 110a-110c to external PDNs, to implement QoS on packet flows, to provide enhanced services to UE 110a-110c, stateful firewalls, Traffic Performance Optimization, combinations thereof or the like. These network elements are not shown in order to illustrate other features of communication system 100. In some embodiments, EPC 122 can include one or more network elements such as, for example, one or more Mobile Switching Centers (MSCs), one or more Serving General Packet Radio Service (GPRS) Support Nodes (SGSNs), one or more Gateway GPRS support nodes (GGSNs), as defined in 3GPP standards for 2G/3G access networks, to facilitate the exchange of data to and from one or more external PDNs for UE 110a-110c. These network elements are also not shown in order to illustrate other features of communication system 100.

For purposes of the examples and embodiments described herein, it is assumed each of UE 110a-110c are in communication with (e.g., connected to) a corresponding remote AP via an over-the-air (OTA) Uu interface, as defined by 3GPP standards, which provides a communication link for one or more voice and/or data sessions such as, for example, an IP connectivity access network (IP-CAN) session, etc. which can support one or more session flows for a given subscriber/UE. For example, UE 110a-110b can be connected to remote AP 114a and UE 110c can be connected to remote AP 114b. It should be understood, however, that any number of UE can be connected to any remote AP 114a-114b within the scope of the teachings of the present disclosure.

As referred to herein in this Specification, the terms 'user', 'subscriber' and 'UE' can be used interchangeably. It should be understood that a user, or more particularly, a subscriber, can be associated with the operation of a corresponding UE for one or more voice and/or data sessions. In various embodiments, a subscriber associated with a given UE can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE.

In various embodiments, UE 110a-110c can be associated with any users, subscribers, employees, clients, customers, etc. wishing to initiate a flow in communication system 100 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 100. UE 110a-110c may also be inclusive of a suitable interface to a human user such as a microphone, a display, a keyboard, or other terminal equipment.

UE 110a-110c may also be any device that seeks to initiate a communication on behalf of another entity or element such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another. In certain embodiments, UE 110a-110c may have a bundled subscription for network access and application services (e.g., voice), etc. Once the access session is established, the user can register for application services as well, without additional authentication requirements. Within communication system 100, IP addresses (e.g., for UE or any other element in communication system 100) can be assigned using dynamic host configuration protocol (DHCP), Stateless Address Auto-configuration (SLAAC), during default bearer activation processes, etc., or any suitable variation thereof. IP addresses used within communication system 100 can include IP version 4 (IPv4) and/or IP version 6 (IPv6) addresses.

Remote APs 114a-114b can offer suitable connectivity to one or more UE (e.g., any of UE 110a-110c) using any appropriate protocol or technique. In various embodiments, one or more remote AP 114a-114b can be configured with functionality (e.g., provisioned with transmitters, receivers, hardware, software, etc.) for a macro cell radio to provide coverage for a macro cell network and/or can be configured with functionality for a small cell radio to provide coverage for a small cell network. Small cell radios operate similar to macro cell radios; however, small cell radios typically at a lower transmit power thereby providing coverage to proximate users. In some embodiments, one or more remote AP 114a-114b can be configured to provide UTRAN coverage (e.g., for 3G access networks), using functionality as is typically configured for a Node B (NodeB or NB) for a macro cell network and/or a Home Node B (HNB) for a small cell network. In some embodiments, one or more remote AP 114a-114b can be configured to provide E-UTRAN coverage (e.g., for 4G/LTE access networks), using functionality as is typically configured for an evolved Node B (eNodeB or eNB) for a macro cell network and/or Home evolved Node B (HeNBs) for a small cell network. In some embodiments, one or more remote AP 114a-114b can be configured to provide coverage for one or more wireless networks for technologies such as WiFi, Bluetooth™, WiMAX, etc. In still some embodiments, one or more remote AP 114a-114b can be configured to provide coverage for any combination of OTA communication technologies.

In one embodiment, the architecture of RAN 112 can represent a cloud RAN (C-RAN) architecture, in which various remote APs (e.g., remote APs 114a-114b) can be deployed at various geographic locations within communication system 100 to provide access network coverage that facilitates seamless mobility for UE (e.g., UE 110a-110c) as the UE move within the communication system. Remote APs 114a-114b can be interconnected via fronthaul network 118 to SON controller 116, which can be configured in a data center (e.g., including one or more servers) or a cloud server center (e.g., including one or more servers interconnected across multiple data centers) that can be approximately located at a different or a same geographic location as any of remote APs 114a-114b.

In some embodiments, a SON controller (e.g., SON controller 116) can have visibility of, and/or may interface with one or more parallel networks such as, for example, a macro cell network, a small cell network, a wireless local area network (WLAN), etc. and can be used to provide coordinated control and configuration between cell radios for a deployment. SON controller 116 can be configured to maintain a system-wide view of communication system 100 and can therefore intelligently provide scheduling/interference constraints to small cell radios for the system. Accordingly, SON controller 116 can be configured to interface with any element or node of communication system 100 via one or more logical interfaces. In at least one embodiment, SON controller 116 can be deployed within a service provider network or within a cloud-based service (e.g., in a centralized SON (cSON) architecture). In various embodiments, SON controller 116 can be a specialized unit or part of a virtualized compute platform that can operate in a data center or cloud server center or any other network element that may be associated with RAN 112. Thus, operational functionality for SON controller 116 may be virtualized into a vRAN architecture to facilitate dynamic control and scheduling operations for communication system 100. In one sense SON controller 116 can represent an inter-cell component and each remote AP 114a-114b can represent intra-cell components for the split RAN architecture of communication system 100.

Before discussing additional operational aspects of communication system 100, it is important to appreciate certain foundational information related to over-the-air communications that can be exchanged between remote APs and UEs. The following foundational information may be viewed as a basis from which the present disclosure can be properly explained. The following foundational information is offered earnestly for teaching purposes only and, therefore, should not be construed in any way to limit the broad teachings of the present disclosure.

As generally provided in 3GPP architectures, data and control information is communicated between remote APs and UEs using Resource Blocks (RBs). RBs can be used for both downlink communications (e.g., transmissions from a given RRU to a given UE served by the RRU) and uplink communications (e.g., transmissions from a given UE to a given RRU serving the UE).

Referring to FIG. 1B, FIG. 1B is a simplified schematic diagram illustrating an example time-frequency grid 130 for a first example downlink RB 132a and a second example downlink RB 132b that can be used for transmitting downlink data and/or control information using Frequency Division Duplexing (FDD) in accordance with one potential embodiment. Each downlink RB 132a, 132b can include a number of resource elements 134 spread across a number of symbols 136 in the time domain and across a number of subcarriers 138 in the frequency domain. Each resource element 134 can represent one symbol 136 by one subcarrier 138. In the frequency domain, the number of subcarriers 138 for each downlink RB 132a, 132b is typically twelve (12) at a subcarrier bandwidth of 15 kilohertz (kHz) for LTE communications. Thus, each downlink RB typically spans 180 kHz of system carrier bandwidth. In the time domain, each respective downlink RB 132a, 132b can include a number of symbols 136 spanning a respective 0.5 millisecond (msec) slot 140a, 140b of a 1 msec subframe (SF) 142. In an FDD deployment, a subframe can contain bi-directional traffic (e.g., uplink and downlink traffic) in different frequency bands. In various embodiments, the number of symbols 167 per RB 132a, 132b can depend on the cyclic prefix (CP) type for transmissions (e.g., seven (7) symbols for normal cyclic prefix or six (6) symbols for symbols for extended cyclic prefix). Thus, for normal CP, the number of resource elements 134 per downlink RB 132a, 132b can be equal to 84 resource elements (e.g., 12 subcarriers×7 symbols=84 resource elements).

The Physical Downlink Control Channel (PDCCH) of downlink subframes in which control information for UE served by a given remote AP can be carried can occupy first 1-4 symbols of the first slot of a subframe depending on channel bandwidth, the number of UE to receive resources, the number of resources each UE is to receive, synchronization channel information (e.g., Cell-Specific Reference signals), etc. UE data can be carried on the Physical Downlink Shared Channel (PDSCH). Because the number of symbols occupied by the PDCCH can vary, the amount of UE data that can be carried in downlink RBs can vary. Uplink RBs for subframes carried on the PUSCH can have a similar structure as downlink RBs. However, the amount of data that can be carried in uplink RBs on the PUSCH typically does not vary. Thus, all uplink RBs typically carry the same amount of data from UEs.

Referring to FIG. 1C, FIG. 1C is a simplified schematic diagram illustrating an example time-frequency grid 150 for a number of resource blocks 152 that can be used for communications in accordance with one potential embodiment. In the frequency domain, resource blocks 152 can be spread across a given system carrier bandwidth 154. In the time domain, resource blocks 152 can span a number of subframes (e.g., $SF0$-$SF_n$) for a number of system frames (e.g., System Frame Number 0 (SFN0)) in which each system frame can span 10 msec.

As system bandwidth can vary for LTE architectures, such as, for example, between 1.25 megahertz (MHz) and 20 MHz, the number of available downlink RBs that can be scheduled or allocated across UEs served by a given remote AP can vary, respectively, between 6 and 100 RBs per 1 msec Transmission Time Interval (TTI) (e.g., 1 msec subframe) for a given transport block of RBs, as defined in 3GPP standards. Typically, a 10 MHz system carrier bandwidth corresponds to 50 available RBs that can be allocated across UEs served by a particular remote AP for a particular TTI of a particular transport block. Typically, each UE served by a given remote AP can be allocated a number of the RBs in the time-frequency grid. Generally, the more RBs that a UE is allocated and the higher the modulation order that is used in transmitting the RBs, then the higher the bit-rate or throughput rate is for the UE. Modulation order is typically referred to in combination with a Modulation and Coding Scheme (MCS). Which RBs and how many each UE is allocated at a given point in time can depend upon frequency and time scheduling mechanisms, interference, etc. for the cellular network. As referred to herein in this Specification, RBs can be generally referred to as 'resources' or 'user data'.

A Channel Quality Indicator (CQI) reported by a UE gives a value corresponding to the highest coding rate that can be used by its serving radio that would result in less than a 10% probability of error that transmission of a transport block would fail for the UE as specified in 3GPP TS 36.214 § 7.2.3. LTE architectures typically employ a Hybrid Automatic Repeat-Request (HARQ) process to detect and correct errors that may occur on the Uu interface. HARQ responses are typically sent from a node that is to receive a transmission back to the node from which the transmission was sent. A HARQ response can either be a Positive-Acknowledgment (ACK) or a Negative-Acknowledgment (NACK). For example, if a transmission is not decoded correctly by a receiving node (e.g., UE 110a), a Negative-Acknowledgement (NACK) is sent from the node that at detected the error back to the node responsible for the transmission to stimulate a retransmission from the transmitting node. HARQ procedures are performed close to the radio interface (e.g., L1) to minimize the response latency and/or retransmission time, in the case of a decode failure. Thus, the HARQ procedure can be viewed as an N-process stop-and-wait reliable transmission method with ACK/NACK feedback.

For Frequency Division Duplexing (FDD) operation in the downlink, HARQ ACKs/NACKs are asynchronous so a HARQ Process ID (PID) is sent on an uplink control channel (e.g., the Physical Uplink Control Channel (PUCCH)) to identify a downlink transmission for which the ACK/NACK refers. In LTE, a downlink retransmission can occur within a minimum of 4 msec after a HARQ NACK but can be delayed longer as identified by its PID.

Some split RAN architectures seek to provide centralized Radio Resource Management (RRM) by splitting RAN control at the Medium Access Control (MAC) layer between a central controller and Remote Radio Units (RRUs) with a user data plane GTP (GTP-U) protocol layer, a Packet Data Convergence Protocol (PDCP) protocol layer, a Radio Link Control (RLC) protocol layer and an upper MAC layer being implemented in the RAN controller and a lower MAC layer, a Layer 1 (L1) Physical (PHY) layer and a Radio Frequency (RF) unit being implemented in the RRUs. The split at the MAC layer allows for some upper level Layer 2 (L2) MAC scheduling to occur at the central controller and lower level L2 scheduling and HARQ processing to be performed at the RRU. Such split RAN architectures, however, may require tight scheduling constraints between the upper MAC and the lower MAC layers thereby potentially requiring low latency (e.g., less than 1 to 2 msec) delay requirements to be placed on fronthaul links between the central controller and the RRUs.

A low latency link in such architectures is typically needed to enable optimal resource allocation and scheduling while also satisfying HARQ processing requirements as defined by 3GPP standards. For Frequency Division Duplexing (FDD) operation, in 3GPP standards define 8 HARQ processes with a 4 msec feedback cycle. In LTE, a downlink retransmission can occur within a minimum of 4 msec after a HARQ NACK but can be delayed longer as identified by its PID. In the uplink, however, HARQ retransmissions are synchronous and therefore must occur 4 msec after a HARQ NACK is sent in response to a previous uplink transmission that was incorrectly decoded.

In the absence of a low link latency, such split RAN architectures can suffer from one or more of: higher latencies on the downlink (DL) since HARQ cycles may be longer on the DL; wasted capacity on the DL and the uplink (UL) since resource allocations determined at the central controller may not match actual available resource at RRUs; and/or lower HARQ combining gains, which can lead to large losses when large bursts of traffic may occur.

Some split RAN architectures also seek to provide centralized interference control among for RRUs. In efforts to increase system capacity and spectral efficiency, 3GPP standards have introduced several techniques to implement Inter-Cell Interference Coordination (ICIC) in cellular networks. 3GPP Release 8 and Release 9 introduced frequency domain ICIC techniques such as Fractional Frequency Reuse (FFR) to enable ICIC in a cellular network in order to mitigate interference between neighboring cell radios. Typically, FFR is implemented in a homogenous network (e.g., consisting only of small cell radios or only of macro cell radios). A basic tenet of FFR is to partition a cell radio's bandwidth for resource (e.g., RB) allocation so that cell edge UE served by neighboring cell radios do not interfere with each other and that the interference received by (and created by) cell interior UEs is reduced.

The use of FFR to mitigate interference for cellular network represents a tradeoff between providing improvements in throughput rate and coverage area for cell edge UE while balancing the sum total network throughput rate and spectral efficiency for all UEs served in the cellular network. In general, the sum total network throughput rate for a cellular network can be referred to as the overall 'utility' for the network.

Generally, FFR is a compromise between hard and soft frequency reuse. Hard frequency reuse splits the system bandwidth into a number of distinct sub-bands according to a chosen reuse factor and allows neighbor cell radios to transmit UE resources on different sub-bands. FFR typically splits the available system bandwidth into inner and outer portions and allocates an inner portion to the UEs located near cell radios in a network (in terms of path loss between the UEs and their corresponding serving cell radios) having reduced power and applying frequency reuse factor of one, e.g., the inner portion is completely reused by all cell radios in the network.

Typically, UEs located in close proximity (in terms of path loss) to a cell radio are referred to as 'cell interior' UEs. For the UEs close to the edges of cell radio coverage areas, generally referred to as 'cell edge' UEs, a fraction of the outer portion of the bandwidth is dedicated with a frequency reuse factor greater than one. The FFR portion of system bandwidth is typically used to serve UEs at cell coverage area edges. With soft frequency reuse the overall bandwidth is shared by all cell radios (i.e., a reuse factor of one is applied) but for the transmission on each sub-carrier, the cell radios are restricted to a particular power bound.

There are two common FFR models: strict FFR and Soft Frequency Reuse (SFR). Strict FFR is a modification of the traditional frequency reuse in which exterior frequency sub-bands are not shared with inner frequency bands. Soft Frequency Reuse (SFR) employs the same cell-edge bandwidth partitioning strategy as Strict FFR, but the interior UEs are allowed to share sub-bands with edge UEs in other cells. Accordingly, shared sub-bands by interior UEs are transmitted at lower power levels than for the cell edge UEs. SFR is more bandwidth efficient than strict FFR, but results in more interference to both cell-interior and edge UEs. Thus, FFR provides various frequency domain ICIC techniques, which can be implemented in order to mitigate inter-cell interference between neighboring cell radios in a cellular network.

3GPP Release 10 introduced time domain ICIC techniques to provide enhanced ICIC (eICIC) in cellular networks in order to mitigate interference for Heterogeneous Networks (HetNets) in which parallel networks (e.g., small cell networks and macro cell networks) are often co-deployed in close proximity. Time domain ICIC techniques incorporate the use of Almost Blank subframes (ABS) and non-ABS subframes for UE resource scheduling, which can be coordinated among cell radios in a given cellular network. For time domain ICIC, small cell radios and macro cell radios can coordinate downlink transmissions to UE served thereby through the use of an ABS pattern, typically determined by a given macro cell radio, in which the macro cell radio may not transmit data traffic to UE served thereby on ABS subframes and any control traffic may be of such a low power as to not interfere with UE served by neighboring small cell radios. Neighboring small cell radios can schedule downlink transmissions to UE served thereby during the ABS subframes of neighboring macro cell radios. The ABS patterns of macro cell radios can be shared or gathered using a variety of techniques.

Typical split RAN architectures that include a central controller for FFR/eICIC typically only consider interference control at the central controller. Interference control parameters determined by the central controller are typically determined over long time scales (e.g., hundreds of msec) using measurement reports, average load information, etc. as defined by 3GPP standards. Thus, typical centralized split RAN architectures that provide for FFR/eICIC likely cannot accommodate resource allocations on a subframe or system frame basis (e.g. 1-10 msec) unless an optical fiber connection, which is often expensive to deploy, is provided to an edge point.

It would be advantageous to provide a split RAN architecture which provides optimizations for both centralized scheduling and for centralized interference management such that: 1) higher latencies can be tolerated between a central controller and remote APs, which would enable the central controller to be moved multiple hops away from the remote APs and potentially in a cloud RAN and/or vRAN environment; 2) gains for centralized scheduling could be realized; 3) overhead communications between the central controller and remote APs could be kept low (e.g., to avoid exchanging messages per TTI); and/or 4) performance could be improved as the latency on the link between the central controller and remote APs reduces without needing a change in architecture or algorithms.

In accordance with one embodiment, communication system 100 can overcome the aforementioned shortcomings (and others) and can enable the aforementioned advantages (and others) by providing a system and method to facilitate centralized Radio Resource Management (RRM) and interference coordination in a split RAN environment. The centralized RRM and interference coordination can be facilitated via CSM 126 and RSMs 124a-124b in combination with various protocol stack configurations that can be provided for SON controller 116 and remote APs 114a-114b.

In one embodiment, the system and method provided by communication system 100 can provide for centralized scheduling and interference coordination by SON controller 116 via CSM 126 by providing scheduling and interference constraints (referred to herein collectively as 'scheduling/interference constraints') to remote APs 114a-114b on a periodic basis for a horizon of time. A 'horizon of time' can represent a time frame related to the subframe processing rate of 1 msec for which the SON controller 116 can calculate scheduling/interference constraints for each remote AP 114a-114b. In various embodiments, the horizon of time for which SON controller 116 can calculate scheduling/interference constraints can range from 2 msec to 15 msec or greater, depending on link latencies that may be present between SON controller 116 and remote APs 114a-114b. Thus, in one embodiment, SON controller 116 can be configured as a central 'baseband' unit, which may provide centralized scheduling/interference constraints to each remote AP 114a-114b to facilitate the scheduling of traffic (data and control traffic) to and from UE 110a-110c via each remote AP 114a-114b.

Remote AP 114a via RSM 124a and remote AP 114b via RSM 124b can provide feedback information to SON controller 116 for use in calculating the scheduling/interference constraints. Each remote AP 114a-114b can perform local scheduling based on scheduling/interference constraints received from SON controller 116 and any local scheduling information available at each remote AP 114a-114b to provide optimized scheduling and interference coordination for UEs (e.g., UEs 110a-110c) served by the remote APs.

During operation, in at least one embodiment, each remote AP/RSM can provide feedback information to SON controller 116/CSM 126, which the SON controller/CSM can use to determine scheduling/interference for the remote APs. SON controller 116 via CSM 126 can generate scheduling/interference constraints based on a selected objective function, as discussed in further detail below, and can send the constraints to each remote AP/RSM in advance of the scheduling interval for which the constraints are to be applied.

By sending the constraints in advance of the scheduling interval for which the constraints are to be applied, each remote AP 114a, 114b can perform optimized local scheduling for UE served thereby using the constraints received from the SON controller in combination with any local scheduling information available at each remote AP. In various embodiments, local scheduling information available at a given remote AP can include one or more of: HARQ ACK/NACK processing information, broadcast signaling and/or Radio Resource Control (RRC) signaling, new CQI information, arrival of new packets having QoS level requirements (e.g., packets associated with low latency or GBR applications), combinations thereof or the like.

In one embodiment, the transmission of feedback information from remote APs 114a-114b can be asynchronous; however, all remote APs should be synchronized at a symbol level (e.g., at about 1/15th of a msec) accuracy to ensure that scheduling/interference constraints received from SON controller 116 will be applied approximately simultaneously at each remote AP to enable coordinate transmission among the remote APs/UEs served by the remote APs.

In one embodiment, feedback information generated by a particular remote AP can include one or more of: number of UE served by the remote AP; estimated Radio Access Bearer (RAB) queue state information per RAB for each UE served by the remote AP; Quality of Service (QoS) information per RAB; and/or channel state information per UE served by the remote AP. Typically, the PDCP layer and the MAC layer maintain a number of queues or buffers for downlink and uplink packets pending for each UE per RAB type. In one embodiment, a set of remote APs (e.g., cells) served by a given SON controller can be represented as $\{1, \ldots, C\}$ and a set UEs associated with (e.g., served by) a remote AP c by $U(c)$ for $c=1, \ldots, C$.

In various embodiments, estimated RAB queue state information can include, but not be limited to, estimated delay, estimated queue length and/or estimated average throughput per UE bearer. Units for estimated queue delay can be in milliseconds, microseconds or any suitable time-based indicator. In various embodiments, estimated queue delay for a particular RAB queue can be indicated to SON controller 116 by identifying one or more of: a per packet delay for each packet of a queue, a head of line delay for a packet at the head of a queue (e.g., assuming packets are queued using a head to tail storage scheme such that packets are served in the order in which they are queued), an overall average queue delay over a horizon for a particular queue, combinations thereof or the like in feedback information sent to the SON controller. Units for estimated queue length can be in bits, bytes or any suitable size-based indicator. In various embodiments, an estimated queue length can be indicated to SON controller 116 by identifying one or more of: a per packet size for each packet of a queue, an overall queue size for a queue, an average queue size over a horizon, combinations thereof or the like.

In at least one embodiment, estimated queue state information computed at a given remote AP can be based on the queue state at the time resource allocation computations are performed at the remote AP (e.g., at the time RBs are scheduled at the remote AP) using any scheduling/interference constraints received from SON controller 116 for a given TTI. It can be assumed, in at least one embodiment, that resources are to be available for scheduling new transmissions for each TTI for each remote AP.

Consider a downlink scenario for a TTI t. The number of packets pending for a given UE u such that UE u belongs to a set of UEs U served by a cell radio c (e.g., $u \in U(c)$) can be represented using a parameter $P_u(t)$. A packet size associated with a packet queued at TTI t for a UE u can be represented using a parameter $q_u(t, \bullet)$ and an estimated queue length can be represented using a parameter $\bar{q}_u(t)$ such that for a number of packets $P_u(t)$ for UE u, $\bar{q}_u(t)=q_u(t,1), q_u(t,2), \ldots, q_u(t,P_u(t))$. An estimated delay associated with each packet queued at TTI t for a UE u can be represented using a parameter $d_u(t, \bullet)$ and an estimated queue delay can be represented using a parameter $\bar{d}_u(t)$ such that for a number of packets $P_u(t)$ for UE u, $\bar{d}_u(t)=d_u(t,1), d_u(t,2), \ldots, d_u(t,P_u(t))$. The estimated average throughput (e.g., bits per second) for a given UE u can be based on past throughput served for the UE and can be represented as $r_u^{avg}(t)$.

In various embodiments, QoS information per RAB can include, but not be limited to, delay target, priority, QoS Class Identifier (QCI) and/or Guaranteed Bit Rate (if applicable) per UE bearer. In various embodiments, channel state information per UE can include, but not be limited to, signal strength information such as spatial channel and/or received signal power to/from a serving radio (e.g., a remote AP) and/or from one or more neighboring interfering APs.

In various embodiments, signal strength information can include, but not be limited to, Reference Signal Received Power (RSRP), Reference Signal Received Quality (RSRQ), Signal-to-Interference-plus-Noise Ratio (SINR), a downlink Channel Quality Indicator (CQI), Common Pilot Channel (CPICH) energy per chip to total Power Spectral Density (PSD) at the UE antenna (Ec/Io), CPICH Received Signal Code Power (RSCP), Received Signal Strength Indicator (RSSI) and/or Received Power Indicator (RCPI), combinations thereof or other signal strength information. Generally, SINR is used to describe or quantify signal quality for downlink transmissions to UE (e.g., from a serving cell radio to a UE) and/or uplink transmissions from UE (e.g., from a given UE to its serving cell radio). In some embodiments, SINR for a given UE (e.g., any of UE 110a-110c) can be determined or estimated based on one or more of: RSRQ as measured by the UE for the Evolved-Universal Terrestrial Radio Access (E-UTRA); downlink CQI reported by the UE through one or more measurement reports, RSRP and/or the received signal strength for a transmission divided by the total interference in the cell. Typically, E-UTRA is described in reference to the 'Uu' air-interface for LTE radio access.

As defined in 3GPP TS 36.214, RSRP is the linear average over the power contributions of resource elements for RBs that carry cell-specific reference signals (CRS) within a considered measurement frequency bandwidth. RSRQ is defined as the ratio of the number (N) of RBs of the E-UTRA carrier RSSI measurement bandwidth (e.g., system bandwidth) multiplied by the RSRP divided by the RSSI, generally expressed as 'N*RSRP/RSSI'. In general, a given UE can measure/determine signal strength information such as, for example, RSRP and/or RSRQ for a serving cell and/or non-serving cells (e.g., neighboring cells), if enabled and can send results of the measurements in one or more measurement reports to its serving cell. In certain embodiments, RSRP and/or RSRQ measurements for neighboring cells can be enabled for UE 110a-110c.

Using the feedback information, SON controller 116 via CSM 126 can determine scheduling/interference constraints in time and frequency (e.g., per sub-band and per subframe) to send to each remote AP/RSM. In one embodiment, the scheduling/interference constraints can include, but not be limited to: 1) the interference level that a remote AP can expect, on average, as a function of frequency (e.g., sub-bands/RBs) and possibly time from neighboring remote APs and UEs served by the remote APs; and 2) one or more interference level(s) that a remote AP and UE served by the remote AP cannot exceed as a function of frequency and possibly time for downlink/uplink transmissions. In at least one embodiment, interference levels can be represented using an Energy Per Resource Element (EPRE) value, which is typically represented in decibels (dB), as a function of RBs. In at least one embodiment, the overall bandwidth for a deployment can be divided into RB 'chunks' in which each RB chunk represents a range of RBs/frequencies such that EPRE interference level(s) included in scheduling/interference constraints sent to each remote AP 114a-114b can be represented as a function of RB chunks.

In a Multiple Input Multiple Output (MIMO) configuration, a UE can receive multiple transport blocks in a single radio transmission from its serving remote AP using a multiple a antennae configuration for the UE and its serving remote AP. In a MIMO scheme, interference constraints can be specified as a function of a matrix of the MIMO channel (e.g., antenna) between a transmitter and an interfered device. For spatial constraints (e.g., per antenna constraint for a MIMO channel) in at least one embodiment, the spatial channel constraint(s) for relevant neighboring remote APs needs to be available at the remote AP for which a scheduling/interference constraint applies.

In various embodiments, the scheduling/interference constraints can be calculated by SON controller 116 via CSM 126 to optimize QoS and fairness across UE served by remote APs 114a-114b. In one embodiment, QoS and fairness can be optimized by ensuring that delay targets are met for delay sensitive QoS bearers. In one embodiment, fairness can be optimized by ensuring that frequency resources are shared fairly across users and bearers. In still one embodiment, QoS and fairness can be optimized by ensuring that delay targets are met for delay sensitive QoS bearers and by ensuring that frequency resources are shared fairly across users and bearers.

A parameter $r_u(t)$ can represent a desired throughput rate for a given UE u for a particular TTI t which can be a function of a desired SINR for the UE, number of resources assigned to the UE and/or other rate parameters. In various embodiments, desirable scheduling properties can be obtained if resources can be allocated every TTI (e.g., every 1 msec subframe) to maximize an objective function $f(\cdot)$ that considers per UE bearer estimated queue length, estimated delay, average throughput and/or desired throughput rate as shown in Equation 1 (Eq. 1), below.

$$\Sigma_c \Sigma_{u \in C(u)} f(\overline{q}_u(t), \overline{d}_u(t), r_u^{avg}(t), r_u(t)) \qquad \text{Eq. 1}$$

In various embodiments, optimizations of the function in Eq. 1 can be considered over various RRM schemes (e.g., ICIC, scheduler, beamforming, etc.), which can be selected to define a feasible set of rates $\{r_u(t), \forall u\}$ over each TTI t for all UE u served by remote APs 114a-114b. In one embodiment, an objective function can be selected to optimize queue based scheduling, which can be represented as $f(q_u(t,1), r_u(t))$. In another embodiment, an objective function can be selected to optimize delay based scheduling, which can be represented as $f(d_u(t,1), r_u(t))$. In another embodiment, an objective function can be selected to optimize proportional fair scheduling, which can be represented as $$f\left(\frac{r_u(t)}{r^{avg}(t)}\right).$$

In yet another embodiment, an objective function can be selected to optimize wideband queue based scheduling, which can be represented as $f(-(\Sigma_i q_u(t,i) - r_u(t))^2)$. In yet another embodiment, an objective function can be selected to optimize delays of all packets, which can be represented as $f(d_u(t, 1), d_u(t, 2), \ldots d_u(t, P_u(t)))$.

However, as noted above, providing scheduling/interference constraints on a per TTI basis can lead to increases in signaling exchanges in a split RAN architecture, which can be impacted by any link latencies that might be present for a given deployment. Thus, SON controller 116 via CSM 126 can generate scheduling/interference constraints based on a selected objective function across a horizon of time and can send the constraints to each remote AP/RSM in advance of the scheduling interval for which the constraints can be applied. In essence, SON controller 116 can generate scheduling/interference constraints on a per subframe basis but by generating the constraints for a horizon of time T (e.g., 10 msec), the scheduling/interference constraints can be sent to each remote AP 114a-114b at a rate lower than the 1 msec subframe scheduling rate at which RBs are being scheduled at each remote AP 114a-114b.

By sending the constraints in advance of the scheduling interval for which the constraints are to be applied, each remote AP 114a-114b can perform optimized local scheduling for UE served thereby at the 1 msec subframe scheduling rate using the constraints received from the SON controller 116 as well as local scheduling information (e.g., HARQ ACK/NACK, packet arrival, signaling packets, etc.) available at each remote AP. The local scheduling information that may be available at each remote AP 114a-114b is used to determine a best resource allocation scheme that obeys the scheduling/interference constraints received from the SON controller 116.

While the CSM 126 determines scheduling/interference constraints based on an expected allocation of RBs to UEs served by each remote AP 114a, 114b over a horizon of time, the actual allocation of RBs that may be scheduled locally by each respective RSM 124a, 124b on a per subframe basis may vary from the expected allocation determined by CSM 126 given that local scheduling information (e.g., queue state, HARQ retransmissions needed, delay sensitive traffic packets needing to be served, etc.) available at each remote AP provides each RSM the most recent information through which to perform the RB scheduling for UE served thereby. Thus, each remote AP 114a, 114b can obey the scheduling/interference constraints as provided by SON controller 116 while meeting the needs of any local scheduling information that may be available at each remote AP.

Accordingly, any link latencies that may be present between SON controller 116 and remote APs 114a-114b can be mitigated by calculating scheduling/interference constraints of the horizon of time while also providing for the realization of gains in system performance that can be realized through centralized and distributed scheduling operations being performed on a per TTI basis.

In one embodiment, scheduling/interference constraints generated by SON controller 116/CSM 126 can be sent to each remote AP 114a-114b as a function of RBs or RB chunks per subframe such that the constraints are identified for each subframe by a corresponding subframe number (SF#) and System Frame Number (SFN).

Consider an operational example involving joint RB scheduling and downlink (DL) ICIC for remote AP 114a via RSM 124a serving UE 110a-110b and remote AP 114b via RSM 124b serving UE 110c. During operation for a joint scheduling and DL ICIC use case, for example, each respective remote AP 114a via RSM 124a and remote AP 114b via RSM 124b can send feedback information to SON controller 116/CSM 126 including one or more of: estimated queue state information, QoS information and/or channel state information (e.g., RSRP, UE CQI, UE power levels, etc. for serving and neighboring remote APs) for UE 110a-110b and UE 110c, respectively. SON controller 116 via CSM 126 can generate scheduling/interference constraints according to a selected objective function for a certain horizon of time T and can send the constraints to remote AP 114a/RSM 124a. As discussed herein, the constraints calculated at SON controller 116/CSM 126 are calculated according to feedback information received from remote AP 114a/RSM 124a, the estimated queue state information, etc. and can be delayed based on link latency between the SON controller and the remote AP as well as any processing delays for each node. However, so long as the overall delay is less than approximately 10-15 msec, then performance degradation in terms of network capacity and delay performance will be typically low, for example, on a range of approximately 10% to approximately 20% of normal performance. In various embodiments, The scheduling/interference constraints can provide for optimized joint scheduling and DL ICIC among distributed remote APs 114a-114b. In one embodiment, the scheduling/interference constraints can include average interference Energy Per Resource Element (EPRE) that each respective remote AP 114a, 114b can expect as a function of RBs or RB chunks, and possibly time (e.g., FFR and potentially eICIC) from neighboring remote AP(s) and UE served thereby and the scheduling/interference constraints can include a maximum PDSCH EPRE as a function of RBs, and possibly time, that each respective remote AP 114a, 114b and UE 110a-110b and UE 110c, respectively, can cause toward one or more neighboring remote AP(s) (e.g., towards each other). In one embodiment, some amount of RBs say, for example 10%, should be set aside (e.g., not have constraints applied thereto) so that a remote AP can allocate resources for cell edge UE packets that arrive after scheduling/interference constraints are computed and received at the remote AP but for which resources may be needed for the cell edge UE(s). In various embodiments, cell edge UE packets for which resources may be needed can include, but not be limited to, RRC exchanges, bearer set-up, VoLTE sessions, gaming sessions (e.g., dedicated bearer packets having low latency and/or QoS level requirements), combinations thereof or the like.

In one embodiment, SON controller 116/CSM 126 can determine downlink transmission power levels across time and frequency for the horizon of time T in order to maximize an objective function as represented by Equation 2 (Eq. 2), shown below over all UEs served across all cell radios (e.g., UE 110a-110c served by remote APs 114a-114b) to maximize QoS and fairness of resource allocations between delay sensitive UE (QoS) and non-delay sensitive UE (BE) (e.g., UE served according to a 'best effort' delay class such that the priority of serving BE delay class UE is below that of serving delay sensitive QoS delay class UE).

$$-\Sigma_{i\in BE} W_i T_i^\alpha + \Sigma_{i\in QoS} \Sigma_{k=1}^{K=argmax_j \Sigma_j X_i(j) \le \Delta q_i} X_i(k) * D_i(k) \quad \text{Eq. 2}$$

Various parameters are discussed herein with relation to Eq. 2 including: a parameter '$R_{ij}$', which can represent the RSRP as measured at a given UE i from a cell j; a parameter '$T_i$', which can represent the average throughput for UE i; a parameter '$q_i$', which can represent the number of bytes awaiting transmission to UE i; a parameter '$w_i$', which can represent a weight of UE i based on any QoS level requirements associated with UE i (note to simplify notation it is assumed that one UE supports one flow, however, this can be generalized to cover multiple flows); a parameter '$X_i(k)$', which can represent the number of bytes for transmission for UE i with a delay represented by a parameter '$D_i(k)$' such that a higher k means more delayed packets (however the quantization of k can be flexible); a parameter '$\Delta q_i$', which can represent the amount of bytes UE i is to be served over a horizon T. For Eq. 2, the first term '$\Sigma_{i\in BE} W_i T_i^\alpha$' can represent the utility function (e.g., using an integral of priority metric) that corresponds to best effort scheduling (e.g., $\alpha=0.01$) for non-delay sensitive UE (BE) and the second term '$\Sigma_{i\in QoS} \Sigma_{k=1}^{K=argmax_j \Sigma_j X_i(j) \le \Delta q_i} X_i(k) * D_i(k)$' can be used to prioritize delay sensitive UE (QoS) having higher delay packets and higher spectral efficiency.

During operation, it is assumed that SON controller 116 has collected various information (e.g., received via feedback information from remote APs 114a-114b, collected via subscriber policy and/or charging information, etc.) to use in determining transmission power levels across time and frequency to maximize the objective function shown in Eq. 2 overall UEs across all remote APs including, but not limited to: $R_{ij}$; $T_i$; $q_i$; $w_i$; $\Delta q_i$; knowledge of whether UE i has delay sensitive traffic (e.g., QCI 1 for VoLTE traffic, QCI 2 for live video traffic, etc.) or not; and, optionally, ($X_i(1)$, $D_i(1)$, . . . ). For example, assume a given UE i has a $\Delta q_i$=2000 bytes and three (3) packets awaiting transmission at a given TTI such that $X_i(1)$=500, $D_i(1)$=100 msec; $X_i(2)$=1000, $D_i(2)$=75 msec; and $X_i(3)$=1200, $D_i(3)$=50 msec. Under an assumption that partial packets cannot be served, the first packet can be served fully with a utility of 500*100; the second packet can be served fully with a utility of 1000*75; and the third packet cannot be served, which means that the utility for the third packet is zero (0). In this manner, SON controller 116 can maximize the objective function represented in Eq. 2 to determine downlink transmit power levels across time and frequency over all UEs served across all remote APs 114a-114b.

In one embodiment, a maximum PDSCH EPRE for an RB served by a remote AP can be determined by dividing the total transmit power for the remote AP uniformly across all RBs that can be served in a subframe, based on system bandwidth. In one embodiment, the determination of the transmit power levels by the SON controller 116 can be performed across each RB available for scheduling for each remote AP based on system bandwidth (e.g., 50 RBs for a 10 MHz system bandwidth). However, solving Eq. 2 for each RB that can be served in each subframe can be computationally expensive.

In another embodiment, the system bandwidth can be divided into RB chunks of a size $\Delta B$ such that the controller can assign constraints for $\Delta B \times T$ chunks over a horizon T. Dividing the system bandwidth into RB chunks can lead to optimizations of Eq. 2 such that a maximum (max) weight scheduler can be ran over each RB chunk where, for each subsequent RB chunk, SON controller 116 can update each queue state under an assumption that any RBs assigned for a previous chunk will be handled accordingly at a given remote AP. While, as discussed herein, the actual resource allocation that may be scheduled at a given remote AP may deviate from the assumptions made via the central scheduling by SON controller 116/CSM 126, subsequent determinations made at the SON controller can be updated based on subsequent feedback information received from the SON controller. In one embodiment, link adaptation (e.g., matching MSC and other signaling and protocol parameters) performed at each remote AP should take into account relative EPRE values provided for optimal MCS selection.

Under an RB chunk operating configuration, Eq. 2 can be optimized as shown in Equation 3 (Eq. 3), below.

$$\sum_{i\in BE, q_i>0} \frac{W_i}{T_i} s_i + \sum_{i\in QoS, q_i>0} D_i W_i s_i \quad \text{Eq. 3}$$

For Eq. 3, $s_i$ is the spectral efficiency of a given UE i and can determined by a function $g(\gamma_i)$ as a function of SINR $\gamma_i$, which can be found as shown in Equation 4 (Eq. 4), where the function $g(\gamma_i)$ represents a mapping between SINR and spectral efficiency, computed based on the modulation and coding scheme used for UE i. Thus, the function typically represents the spectral efficiency sustainable at low values of bit error rate (e.g., $10^{-6}$).

$$\gamma_i = \frac{G_{serv(i)} P_{serv(i)}}{\sum_{j\ne serv(i)} G_j P_j} \quad \text{Eq. 4}$$

For Eq. 4, a parameter '$G_{serv(i)}$' can represent the channel gain of a serving remote AP for UE i for a given RB chunk; a parameter '$P_{serv(i)}$' can represent the PDSCH EPRE of the serving remote AP for UE i for the RB chunk; a parameter '$G_j$' can represent that channel gain of neighboring remote AP(s) j (as summed across the number of remote AP(s)) for the RB chunk; and a parameter '$P_j$' can represent the PDSCH EPRE of neighboring remote AP(s) j (as summed across the number of remote AP(s)) for the RB chunk. Computation of the PDSCH EPRE for each remote AP j is needed to maximize the objective function shown in Eq. 3. In one embodiment, gradient descent can be used to obtain a local maxima for an RB chunk. In various embodiments, channel gains can be calculated via RSRP reported by each UE and knowledge of the CRS EPRE at each remote AP for a given deployment. In at least one embodiment, knowledge of the CRS EPRE at each remote AP can be collected by SON controller 116 or communicated to SON controller 116 at power-on/initialization of each remote AP 114a-114b, at periodic intervals, combinations thereof or the like. The bytes that can be drained from each queue for each subsequent chunk and be determined such that $\Delta q_i = s_i \times \Delta B \times 1$ msec, which is the number of bytes served for a previous RB chunk.

For Eq. 3, a parameter '$D_i$' can represent head of line delay, which is the delay of the packet at the head of each queue after a number of $\Delta q_i$ bytes are served for a previous RB chunk. Upon optimizing transmission power levels for a previous RB chunk, a queue length for UE i can be calculated as $q_i = q_i - \Delta q_i$ and an average throughput for the UE can be calculated as $R_i = (1-\alpha)R_i + \alpha s_i$.

Consider an example involving a 20 MHz system bandwidth in which approximately 100 RBs can be allocated in each subframe. Assuming a 10 msec horizon and 4 RB chunks per subframe, then the transmit power levels can be optimized over four (4) sets of 25 RBs for each 1 msec subframe. During operation, at time t=0, SON controller 116 can determine the PDSCH EPRE at each remote AP to maximize the objective function shown in Eq. 3 for a first chunk of 25 RBs. Assuming $\Delta q_i$ bytes are drained from each UE i queue for the first chunk, SON controller 116 can update the estimated queue state of each UE i using the techniques discussed above, which can correspond to SON controller 116 updating $T_i, (X_i(1), D_i(1), \ldots)$ for each UE i, which may have packets served via the first chunk of 25 RBs. For the second 25 RB chunk at t=0, SON controller can re-optimize the objective function shown in Eq. 3 using updated estimated queue state information determined at the end of operations performed for the first 25 RB chunk, which can be found based on the computed bytes served for each UE i in the first 25 RB chunk.

As discussed herein, however, the RB scheduling decisions and assumptions on which UEs can have packets served for each RB chunk as calculated by SON controller 116 for a current horizon of time is based on feedback information sent from each remote AP 114a-114b, which may be stale in comparison to local scheduling information that may become available to each remote AP during the processing and signaling latency time at which each remote AP receives scheduling/interference constraints from the SON controller 116. Nonetheless, the SON controller 116 is not concerned with the actual RB scheduling performed by each remote AP 114a-114b but rather setting EPRE levels that are to be obeyed by each remote AP 114a-114b for scheduling downlink transmissions. Further, subsequent feedback information received from each remote AP 114a-114b can be used to update any incorrect RB scheduling decisions and assumptions made at the SON controller 116.

Thus, UE RB scheduling as provided by the split RAN architecture of communication system 100 can involve two time-scale computations: 1) computations performed across a horizon of time (e.g., 10 msec, etc.) at the SON controller; and 2) computations performed at a 1 msec subframe rate by each remote AP 114a-114b. Computations performed for a certain horizon of time can be performed in a centralized manner by the SON controller 116 in order to determine power levels (e.g., scheduling/interference constraints) at which each UE can be served in order to optimize overall network performance in UE throughput and network capacity. Computations performed for each remote AP 114a-114b at the 1 msec subframe rate can be used to determine the actual resource allocations for each UE served thereby for any new transmissions and/or re-transmissions while obeying the scheduling/interference constraints received from the SON controller 116. In various embodiments, the RB scheduling performed at each remote AP 114a-114b can be performed using standard techniques to best optimize fairness, throughput and delay performance based on the most recent queue and delay information for packets queued as well as channel information to satisfy the scheduling/interference constraints provided to each remote AP.

Accordingly, the system and method provided by the split RAN architecture of communication system 100 can provide various advantages over split RAN architectures that seek only to provide centralized scheduling or interference coordination. In various embodiments, these advantages can include, but not be limited to: 1) providing tolerance for higher latencies between a central controller (e.g., SON controller 116) and remote APs (e.g., remote APs 114a-114b), which can enable the central controller to be moved multiple hops away from the remote APs and potentially be implemented in a C-RAN and/or vRAN environment; 2) realizing gains in capacity increases and reductions in packet delay through centralized scheduling; 3) reducing overhead communications between the central controller and remote APs (e.g., avoiding the need to exchange messages per TTI); and/or 4) providing a system and method in which performance (e.g., UE throughput, capacity, etc.) can be improved as link latencies between the central controller and remote APs reduce, without requiring changes in architecture or algorithms implemented for the network. In at least one embodiment, for a virtualized architecture one or more standardized Application Programming Interfaces (APIs) can be used to provide the coordination between centralized and distributed components in order to perform the operations discussed herein.

Turning to FIG. 2, FIG. 2 is a simplified schematic diagram 200 illustrating example signaling interactions and operations that can be associated with providing centralized RRM in accordance with one potential embodiment of communication system 100. FIG. 2 includes remote AP 114a, remote AP 114b and SON controller 116. It should be understood that signaling interactions between SON controller 116 and remote APs 114a-114b can be facilitated as described herein via CSM 126 for SON controller 116 and RSM 124a-124b for remote APs 114a-114b, respectively. The example signaling interactions illustrated in the embodiment of FIG. 2 can represent a 'snapshot' in time of example signaling that can be performed between SON controller 116 and remote APs 114a-114b across a horizon of time (e.g., 10 msec), which can include a first time interval $T_1$ and a second time interval $T_2$ (e.g., 5 msec intervals).

At 202, remote AP 114a sends feedback information to SON controller 116, which includes channel state information and estimated queue state information as determined by remote AP 114a/RSM 124a within the first time interval $T_1$. At 204, remote AP 114b sends feedback information to SON controller 116, which include channel state information and estimated queue state information as determined by remote AP 114b/RSM 124b within the first time interval $T_1$. Thus, in accordance with at least one embodiment, each remote AP 114a-114b can be configured to determine feedback information to send to SON controller 116 according to a feedback period (e.g., once every 5 msec) configured for each remote AP 114a-114b. The signaling from each remote AP 114a, 114b can be delayed according to a one-way link latency that exists for communications from each remote AP to SON controller 116. In various embodiments, the one-way link latency from each remote AP 114a, 114b, respectively, to SON controller 116 can be the same or different. In one embodiment, SON controller 116 can set the feedback period for each remote AP 114a-114b based on link latencies between the remote APs, which can be measured by SON controller 116. In at least one embodiment, SON controller 116 can measure link latencies between each remote AP by measuring round trip times using, for example, ping packets.

For example, if one-way link latencies between the SON controller 116 and each remote AP 114a-114b are less than 1 msec, then the horizon of time for which the SON controller 116 can calculate scheduling/interference constraints can be set to 2 msec and the feedback period for remote APs 114a-114b can also be set to 2 msec. In one embodiment, the remote APs 114a-114b can be configured to provide feedback information in a manner that is offset with a horizon of time T for which scheduling/interference constraints are calculated at the SON controller 116 such that the remote APs 114a-114b provide feedback information to the SON controller 116 at a time equal to T/2.

At 206, the SON controller 116 via CSM 126 calculates scheduling/interference constraints for the horizon of time $[T_1,T_2]$ for each of remote AP 114a and remote AP 114b according to a selected objective function. At 208, the SON controller 116 sends the scheduling/interference constraints for remote AP 114a to the remote AP. At 210, the SON controller 116 sends the scheduling/interference constraints for remote AP 114b to the remote AP. The signaling from SON controller 116 can be delayed according to a one-way link latency that exists for communications from SON controller 116 toward each remote AP 114a, 114b. In various embodiments, the one-way link latency from SON controller 116 toward each remote AP 114a, 114b, respectively, can be the same or different and, furthermore, can be the same or different in relation to the one-way link latency from each remote AP 114a, 114b, respectively, toward SON controller 116.

At 212, remote AP 114a via RSM 124a performs RB scheduling for any remaining subframes to be served for UE 110a-110b for the first time interval $T_1$ using the scheduling/interference constraints received at 208 and any local scheduling information available at the remote AP. At 214, remote AP 114b via RSM 124b performs RB scheduling for any remaining subframes to be served for UE 110c for the first time interval $T_1$ using the scheduling/interference constraints received at 210 and any local scheduling information available at the remote AP. The first time interval $T_1$ ends at 216.

At 218, remote AP 114a via RSM 124a begins scheduling RB for subframes to be served for UE 110a-110b for the second time interval $T_2$ using the scheduling/interference constraints received at 208 and any local scheduling information available at the remote AP. At 220, remote AP 114b via RSM 124b begins scheduling RBs for subframes to be served for UE 110c for the second time interval $T_2$ using the scheduling/interference constraints received at 210 and any local scheduling information available at the remote AP.

At 222, remote AP 114a via RSM 124a determines feedback information within the second time interval $T_2$ based, at least in part, on queue state information estimated at the remote AP 114a. At 224, remote AP 114b via RSM 124b determines feedback information within the second TTI $T_2$ based, at least in part, on queue state information estimated at the remote AP 114b. Although illustrated in a serial manner, it should be understood that operations at 218 and 222 for remote AP 114a and 220 and 224 for remote AP 114b could be, and in at least one embodiment are, performed in parallel.

At 226, remote AP 114a sends its feedback information to SON controller 116 for the second time interval $T_2$ and at 228 remote AP 114b sends its feedback information to SON controller 116 for the second time interval $T_2$ and the operations can continue therefrom using signaling and operations as described above for the second time interval $T_2$ and any subsequent time intervals.

Figure 3A:
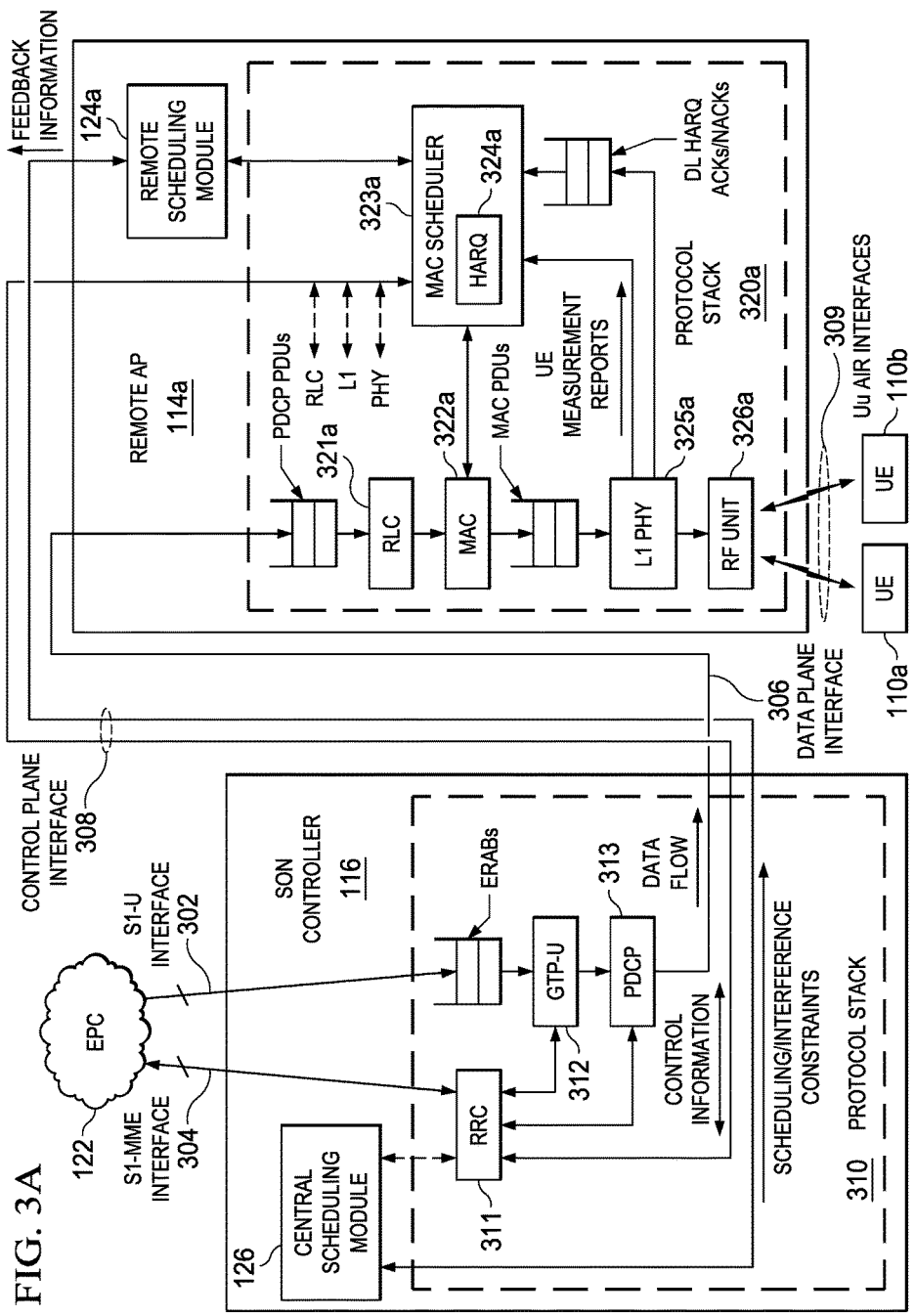
FIGS. 3A-3B are simplified block diagrams illustrating example details that can be associated with various potential embodiments of the communication system.
Figure 3B:
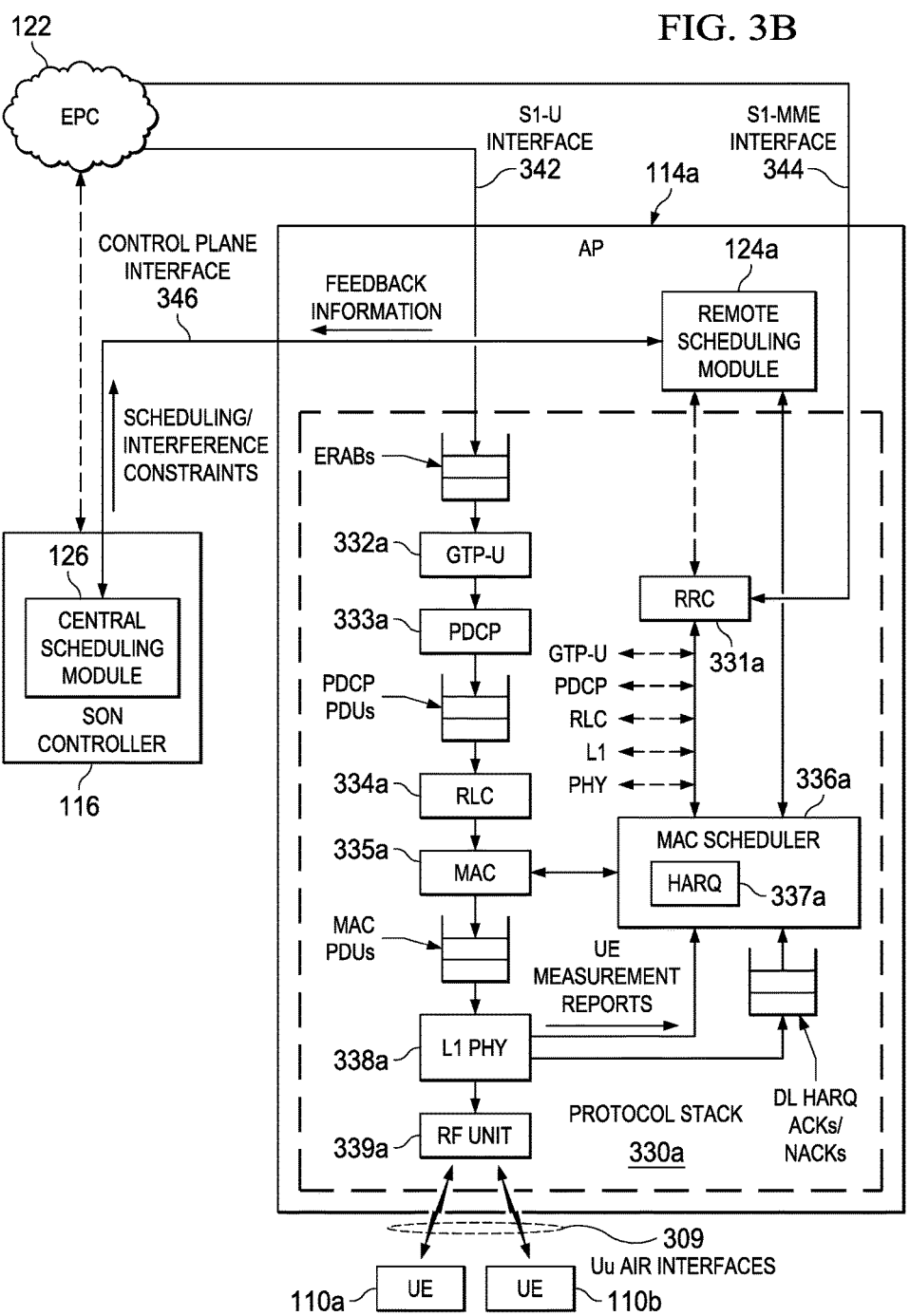

Turning to FIGS. 3A-3B, FIGS. 3A-3B are simplified block diagrams illustrating example details that can be associated with SON controller 116 and a particular remote AP (e.g., remote AP 114a) for various protocol stacks that can be configured for communication system 100. In particular, FIGS. 3A-3B illustrate example details associated with protocol stacks and flows that can be associated with downlink RB scheduling for remote AP 114a. A 'protocol layer' or 'layer', as referred to herein, can be any layer in a multi-layered scheme that facilitates communications between layers, such as, for example, the Open Systems Interconnection (OSI) Model, using one or more communication protocols and a 'protocol stack' can be any number of protocol layer(s) configured for a particular node (e.g., SON controller 116, remote AP 114a, remote AP 114b, etc.). Although FIGS. 3A-3B illustrate example details associated with remote AP 114a, it should be understood that the example details can be associated with remote AP 114b equally in one or more embodiments.

Referring to FIG. 3A, FIG. 3A includes SON controller 116 interfacing with EPC 122 and further interfacing with remote AP 114a. UE 110a-110b are also shown in FIG. 3A. In the embodiment shown in FIG. 3A, SON controller 116 can include Central Scheduling Module (CSM) 126 and a protocol stack 310, which can include an RRC layer 311, a user data plane GTP (GTP-U) protocol layer 312 and a Packet Data Convergence Protocol (PDCP) protocol layer 313. Remote AP 114a can include Remote Scheduling Module (124a) and a protocol stack 320a, which can include a Radio Link Control (RLC) layer 321a, a MAC layer 322a, a MAC Scheduler layer 323a, a HARQ layer 324a, a Layer 1 (L1) Physical (PHY) layer 325a and an RF unit 326a.

A user data plane S1-U interface 302 provided via backhaul network 120 can facilitate the exchange of downlink data, such as packetized E-UTRAN Radio Access Bearers (ERABs) for one or more UE (e.g., UE 110a, 110b), between one or more elements of EPC 122 and SON controller 116 via GTP-U layer 312. A control plane S1-MME interface 304 provided via backhaul network 120 can facilitate the exchange of Non-Access Stratum (NAS) control signaling between one or more elements of EPC 122 and SON controller 116 via RRC layer 146. Uu air interfaces 309 between each UE 110a-110b and RF unit 326a facilitate over-the-air communication links between the UE and remote AP 114a.

A user data plane interface 306, provided via fronthaul network 118 can facilitate the exchange of downlink data, such as packetized PDCP Protocol Data Units (PDUs) between PDCP layer 313 of SON controller 116 and MAC layer 322a of remote AP 114a. A control plane interface 308, provided via fronthaul network 118 can facilitate the exchange of scheduling/interference constraints and feedback information between CSM 126 and RSM 124a as well as any protocol layer control signaling exchanged via RRC layer 311 and one or more protocol layers of protocol stack 320a.

As MAC layer 322a and MAC Scheduler layer 145 operate in combination with each other, these layers can be referred to collectively as MAC 322a/MAC Scheduler 323a, although specific operations and/or features that might pertain to a particular layer can be referenced with respect to the particular layer as well. HARQ layer 324a and MAC Scheduler 323a can also MAC Scheduler 323a/HARQ 324a.

During operation in a downlink data scenario, downlink data such as packetized ERABs, which are to be scheduled for downlink transmissions to a given UE (e.g., UE 110a) for one or more TTIs can be received by SON controller 116 via GTP-U layer 312. The ERABs can be routed to PDCP layer 313, which can operate on the ERABs as PDCP Service Data Units (SDUs) and can generate PDCP PDUs to output to RLC layer 321a via data plane interface 306. In one embodiment, PDCP layer 313 can apply an air crypto (e.g., encryption) and/or other addressing/control information to the packets based on control signaling received from RRC layer 311.

CSM 126 can receive feedback information from RSM 124a and RSM 124b (not shown in FIG. 3A) for a current TTI for which the remote AP 114a, 114b are performing scheduling operations. Based, at least in part, on the feedback information, CSM can generate scheduling/interference constraints to send to RSM 124a and RSM 124b via control plane interface 308. In at least one embodiment, CSM 126 can also interface with RRC layer 311 to enable the CSM access to any UE measurement reports that may be used by the CSM to determine scheduling/interference constraints.

The PDCP PDUs received by remote AP 114a can be stored in various per UE bearer queues such that each UE bearer queue may correspond to each RAB established for each UE 110a-110b. A Radio Access Bearer (RAB) or, more generally, a 'bearer' can refer to a path, channel, tunnel or the like through which communications can be exchanged between two endpoints for a particular service, application, etc. Typically, bearers are referred to in association to communications exchanged between a UE and one or more nodes of the EPC. At a minimum, a default bearer, as defined in 3GPP standards, is established for each UE 110a-110b upon attachment of each UE 110a-110b to remote AP 114a. The default bearer is associated with an IP address for the UE, which can be assigned via DHCP, SLAAC, from a pool of IP addresses, etc., and an IP address for an EPC node. A default bearer is typically used to exchange non-GBR traffic with a given UE.

In some embodiments, one or more dedicated bearers can be established for a given UE for one or more specialized services or applications provided to the UE such as, for example, a VoLTE session, a data session, a Voice over IP (VoIP) session, a gaming session, combinations thereof or the like. In various embodiments, dedicated bearers can be associated with GBR traffic and/or QoS level requirements for such traffic, which can affect the priority for scheduling RBs for data packets associated with such bearers. In various embodiments, QoS level requirements can define for a particular bearer or bearer type: a priority; a packet drop structure (e.g., number of packets that can be dropped or re-ordered); timing requirements and/or other similar packet level requirements. In some embodiments, a QoS level requirement and any requirements defined thereby can be associated to a corresponding QoS Class Identifier (QCI). QoS level requirements are not typically provided for default bearers; however, in at least one embodiment, a default bearer can be configured with a minimum rate at which the default bearer is to be served.

RLC layer 321a can operate on the PDCP PDUs as RLC SDUs and can generate RLC PDUs to output to MAC layer 322a. In one embodiment, RLC layer 321a can concatenate and segment higher layer PDCP PDUs into pre-derived packetized data blocks that can be passed to MAC layer 322a based on control signaling received from RRC layer 311.

RB scheduling for remote AP 114a can be performed via MAC layer 322a, MAC Scheduler layer 323a, HARQ layer 324a and RSM 124a. MAC Scheduler layer 323a can exchange packet level information with MAC layer 322a; can receive scheduling/interference constraints for a remaining portion of a current TTI and for a first portion of a subsequent TTI from RSM 124a and can receive DL HARQ ACKs/NACKs and measurement reports from UE 110a-110b via L1 PHY layer 325a.

MAC layer 322a can operate on the RLC PDUs as MAC SDUs and can generate MAC PDUs to send to L1 PHY layer 325a. The MAC PDUs can be stored in per UE bearer queues such that each UE bearer queue may correspond to each RAB established for each UE 110a-110b. The MAC PDUs can include DL RBs containing data and/or control information or, more generally, resources allocated to UEs 110a-110b across the frequency and time domains. The RBs are to be transmitted within transport blocks via over-the-air DL transmissions to UE 110a-110b according to scheduling determined via MAC Scheduler 323a and/or HARQ 324a (e.g., if DL HARQ retransmissions are needed).

In at least one embodiment, packets/data stored in a MAC PDU queue and a PDCP PDU queue for a particular UE bearer can be accessed using a same pointer address that is shared for the MAC PDU queue and the PDCP PDU queue for the particular UE bearer. Thus, the amount of memory or storage allocated to the PDCP PDU queue and the MAC PDU queue can be of an equal size. In at least one embodiment, remote APs 114a-114b can maintain statistics for each PDCP and/or MAC queue maintained for each UE bearer/UE served by each remote AP such that an estimated RAB queue state can be determined at various times (e.g., based on a given feedback period) during operation.

As referred to herein in this Specification, a 'MAC PDU' can be referred to interchangeably as a 'transport block' as MAC PDUs are transmitted to UEs via transport blocks processed at the L1 PHY layer and RF unit of a remote AP (e.g., L1 PHY layer 325a and RF unit 326a of remote AP 114a).

RB scheduling for remote AP 114a can be performed using the scheduling/interference constraints received from SON controller 116 in combination with local scheduling information available at the remote AP. In one embodiment, the RB scheduling can include evaluating the scheduling information available at the remote AP associated with UE 110a-110b and determining an allocation of RBs for each UE that meets constraints (e.g., EPRE as function of RBs or RB chunks) received from the SON controller.

In various instances, the scheduling/interference constraints may not provide for a certain number of RBs to be scheduled without interference constraints being applied to the RBs; one or more RBs may be needed to accommodate scheduling for HARQ retransmissions; and/or one or more RBs may be needed to accommodate scheduling for one or more packets that have either a low a low latency requirement and/or a QoS level requirement that needs to be satisfied. Further, the state of RAB queues maintained at the remote AP 114a can change as packets are served to UE 110a-110b.

Thus, the RB scheduling at the remote AP 114a can be performed based on both of the scheduling/interference constraints received from SON controller 116 and the local scheduling information available at the remote AP. For example, the RB scheduling can be performed such that interference caused toward remote AP 114a is less than or equal to the maximum PDSCH EPRE for certain RBs and the MCS can be selected for each UE based on the local scheduling information available at remote AP 114a such as, for example, CQI, RSRP, etc. received in UE measurement reports.

Thus, as illustrated in the embodiment of FIG. 3A, a split protocol stack can be configured between the SON controller 116 and remote APs 114a-114b to facilitate centralized RRM operations in a split RAN environment.

Referring to FIG. 3B, FIG. 3B includes SON controller 116 interfacing with EPC 122 and further interfacing with remote AP 114a. UE 110a-110b are also shown in FIG. 3B. In the embodiment shown in FIG. 3B, SON controller 116 can include Central Scheduling Module (CSM) 126. Remote AP 114a can include Remote Scheduling Module (124a) and a protocol stack 330a, which can include an RRC layer 331a, a GTP-U layer 332a, a PDCP layer 333a, an RLC layer 334a, a MAC layer 335a, a MAC Scheduler layer 336a, a HARQ layer 337a, a L1 PHY layer 338a and an RF unit 339a.

A user data plane S1-U interface 342 provided via portions of backhaul network 120 and fronthaul network 118 can facilitate the exchange of downlink data, such as packetized ERABs for one or more UE (e.g., UE 110a, 110b) between one or more elements of EPC 122 and remote AP 114a via GTP-U layer 332a. A control plane S1-MME interface 344 provided via portions backhaul network 120 and fronthaul network 118 can facilitate the exchange of NAS and/or other control signaling between one or more elements of EPC 122 and remote AP 114a via RRC layer 331a. A control plane interface 346, provided via fronthaul network 118 can facilitate the exchange of scheduling/interference constraints and feedback information between CSM 126 and RSM 124a. Uu air interfaces 309 between each UE 110a-110b and RF unit 339a facilitate over-the-air communication links between the UE and remote AP 114a. In at least one embodiment, RSM 124a can interface with RRC 331a.

RB scheduling operations for remote AP 114a similar to those as described for the embodiment shown in FIG. 3A; however, the embodiment shown in FIG. 3B may provide certain advantages over the embodiment shown in FIG. 3A. One advantage may include removing user data plane data flows from passing through SON controller 116 and instead being handled directly by remote AP 114a and remote AP 114b (not shown in FIG. 3B). Removing user data plane data flows from passing through SON controller 116 may reduce the complexity of the deployment and may also reduce the complexity of configurations for SON controller 116.

Figure 4A:
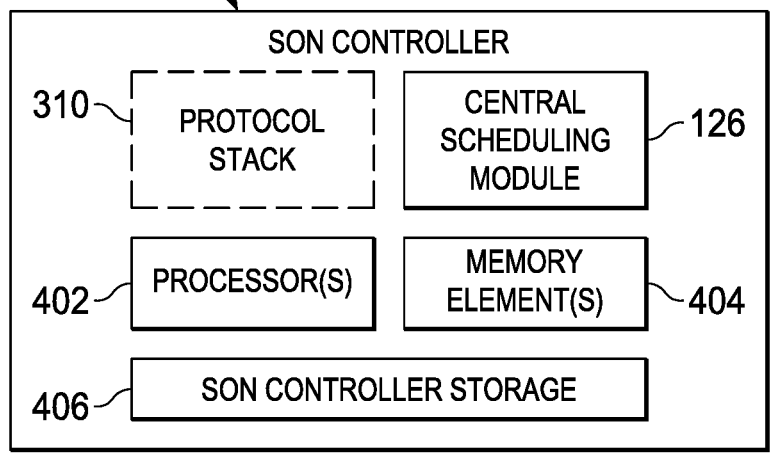
FIGS. 4A-4B are simplified block diagrams illustrating other example details that can be associated with various potential embodiments of the communication system.
Figure 4B:
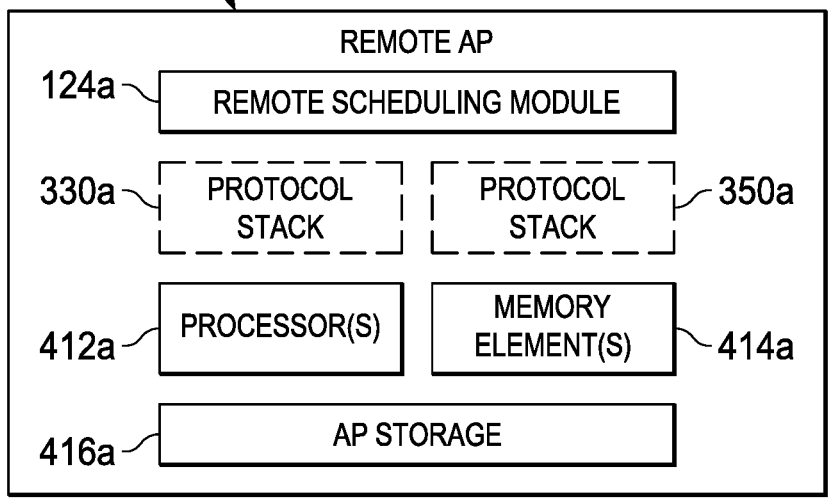

Turning to FIGS. 4A-4B, FIGS. 4A-4B are simplified block diagrams illustrating other example details of various elements that can be associated with communication system 100 in accordance with one or more potential embodiments. FIG. 4A is a simplified block diagram illustrating other example details that can be associated with SON controller 116 in accordance with one potential embodiment of communication system 100. FIG. 4B is a simplified block diagram illustrating other example details that can be associated with remote AP 114a in accordance with one potential embodiment of communication system 100. Although FIG. 4B discusses example details related to remote AP 114a, it should be understood that the example details as discussed for remote AP 114a can be equally applied to remote AP 114b.

Referring to FIG. 4A, SON controller 116 can include Central Scheduling Module (CSM) 126, at least one processor(s) 402, at least one memory element(s) 404 and a SON controller storage 406. In at least one embodiment, SON controller 116 can include protocol stack 310 (e.g., as discussed for the embodiment of FIG. 3A).

In at least one embodiment, at least one processor(s) 402 is at least one hardware processor(s) configured to execute various tasks, operations and/or functions associated with SON controller 116 as described herein and at least one memory element(s) 404 is configured to store data associated with SON controller 116. In at least one embodiment, one or more layers of protocol stack 310 (e.g., a GTP-U layer and a PDCP layer) can be configured to facilitate various RRM operations as described herein for user plane data flows. In various embodiments, CSM 126 can be configured to facilitate various RRM operations as described herein such as, for example, generating scheduling/interference constraints for one or more remote APs (e.g., remote APs 114a-114b) based on feedback information received from the remote APs.

In various embodiments, SON controller storage 406 can be configured to store information associated with various RRM operations as described herein including, but not limited to, estimated queue state information, channel state information, FFR resource fraction information (e.g., a fraction of resources to be allocated across one or more frequencies or ranges of frequencies), eICIC information for one or more macro cells (e.g., ABS pattern), interference information, QoS information (e.g., per bearer latency and/or QoS level requirements), UE information for a number of UE served by remote APs, configuration information for one or more objective functions that can be configured for SON controller 116, combinations thereof or the like.

Referring to FIG. 4B, remote AP 114a can include Remote Scheduling Module (RSM) 124a, at least one processor(s) 412a, at least one memory element(s) 414a and an AP storage 416a. In at least one embodiment, at least one processor(s) 412a is a hardware processor(s) configured to execute various tasks, operations and/or functions of remote AP 114a as described herein and at least one memory element(s) 414a is configured to store data associated with remote AP 114a. In at least one embodiment, protocol stack 330a (e.g., as discussed for the embodiment of FIG. 3A) or protocol stack 350a (e.g., as discussed for the embodiment of FIG. 3B) can be configured for remote AP 114a.

In at least one embodiment, one or more layers of protocol stack 330a or protocol stack 350a can be configured to facilitate various RRM operations as described herein for user plane data flows an RB scheduling. In various embodiments, RSM 124a can be configured to facilitate various operations as described herein such as, for example, generating feedback information for SON controller 116 and performing RB scheduling for one or more UE (e.g., UE 110a-110b) served by the remote AP.

In various embodiments, AP storage 416a can be configured to store information associated with various operations as described herein including, but not limited to, estimated queue state information, channel state information, FFR resource fraction information (e.g., a fraction of resources to be allocated across one or more frequencies or ranges of frequencies), eICIC information for one or more macro cells (e.g., ABS pattern), scheduling/interference constraints received from SON controller 116, QoS information (e.g., per bearer latency and/or QoS level requirements), UE measurement report information for a number of UE served by the remote AP, HARQ processing configuration information, combinations thereof or the like.

In regards to the internal structure associated with communication system 100, each of UE 110a-110c and remote 114b may each also include a respective processor, a respective memory element a respective storage and a respective protocol stack. Hence, appropriate software, hardware and/or algorithms are being provisioned in UE 110a-110c, remote AP 114a-114b, and SON controller 116 in order to facilitate centralized RRM operations in a split RAN environment as described for various embodiments discussed herein. Note that in certain examples, certain databases (e.g., for storing information associated with providing centralized RRM operations for communication system 100) can be consolidated with memory elements (or vice versa), or the storage can overlap/exist in any other suitable manner.

In one example implementation, UE 110a-110c, remote AP 114a-114b, and SON controller 116 are network elements, which are meant to encompass network appliances, servers, routers, switches, gateways, bridges, loadbalancers, firewalls, processors, modules, or any other suitable device, component, element, or object operable to exchange information that facilitates or otherwise helps facilitate centralized RRM operations involving remote APs cell radios (e.g., for networks such as those illustrated in FIG. 1A). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms and communication protocols that allow for the effective exchange of data or information.

In various embodiments, UE 110a-110c, remote AP 114a-114b, and SON controller 116 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. Information being tracked or sent to UE 110a-110c, remote AP 114a-114b, and SON controller 116 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and/or user equipment can also include suitable interfaces, protocol stacks, for receiving, transmitting, and/or otherwise communicating data or information in a network environment.

Note that in certain example implementations, the centralized RRM operations as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor, or other similar machine, etc.). In some of these instances, memory elements [as shown in FIGS. 4A-4B] can store data used for the operations described herein. This includes the memory elements being able to store software, logic, code, or processor instructions that are executed to carry out the activities described herein. A processor (e.g., a hardware processor) can execute any type of instructions associated with the data to achieve the operations detailed herein. In one example, the processors [as shown in FIGS. 4A-4B] could transform an element or an article (e.g., data, information) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP processor, an EPROM, an electrically erasable PROM (EEPROM) or an ASIC that includes digital logic, software, code, electronic instructions, or any suitable combination thereof.

Turning to FIG. 5, FIG. 5 is a simplified flow diagram illustrating example operations 500 that can be associated with providing centralized RRM in a split RAN environment in accordance with one potential embodiment of communication system 100. At 502, the operations can include receiving UE measurement reports from one or more UE served by one or more remote AP(s) (e.g., UE 110a-110b served by remote AP 114a and UE 110c served by remote AP 114b). At 504, the operations can include generating feedback information at each of the one or more remote APs based, at least in part, on the measurement reports received from the UE. The feedback information can also be generated based on estimate queue states and delays associated with the queues at each remote AP(s). At 506, the operations can include each remote AP(s) sending the feedback information to a SON controller (e.g., SON controller 116).

At 508, the operations can include the SON controller determining constraints (e.g., scheduling/interference constraints) for a horizon of time (e.g., 10 msec) for each remote AP(s) based on the feedback information received from each of the remote AP(s). In one embodiment, the constraints can be determined on a per remote AP basis based on feedback information received from all the remote AP(s) using a particular objective function configured for the SON controller by a network operator or service provider. In various embodiments, the constraints can be associated with one or more interference levels that a particular remote AP can expect, on average, as a function of frequency and/or time from neighboring remote AP(s). In various embodiments, the constraints can be associated with one or more maximum interference level(s) that a particular remote AP and one or more UE served by the particular remote AP can cause toward the one or more neighboring remote APs and one or more UE served by the neighboring remote APs as a function of frequency and/or time.

At 510, the operations can include the SON controller sending the constraints to each remote AP(s). At 512, the operations can include performing RB scheduling at each remote AP(s) for user equipment served by the remote AP(s) for a current TTI and one or more subsequent TTIs based, at least in part, on the constraints received from the SON controller and the operations can return to 502 in which subsequent measurement reports can be received from UE for determining subsequent feedback information at the remote AP(s) and the operations can repeat for a number of TTIs. As discussed for various embodiments herein, the RB scheduling performed at each remote AP can be performed using the constraints received from the SON controller in combination with any local scheduling information that may be available at each remote AP.

Figure 6:
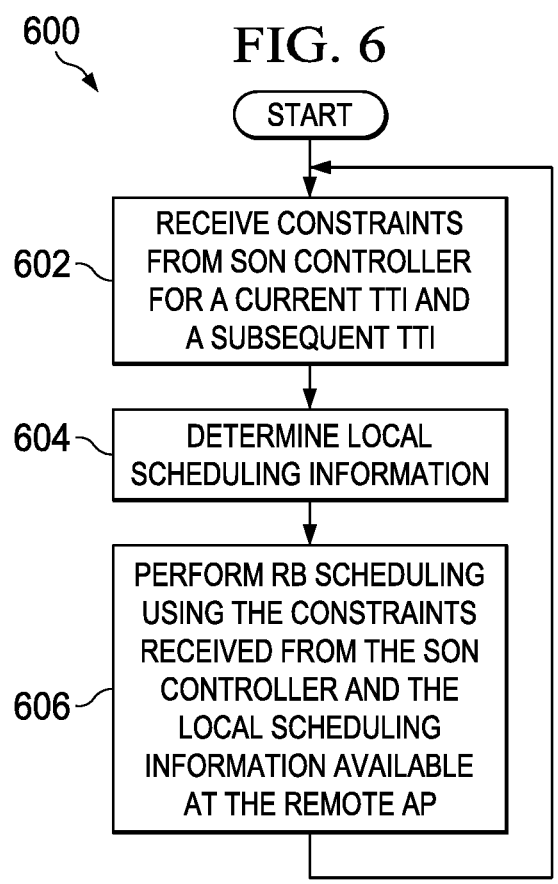
FIG. 6 is a simplified flow diagram illustrating example operations that can be associated with providing resource block scheduling by a remote access point in a split RAN environment in accordance with one potential embodiment of the communication system.

Turning to FIG. 6, FIG. 6 is a simplified flow diagram illustrating example operations 600 that can be associated with providing RB scheduling by a given remote AP (e.g., remote AP 114*a* via RSM 124*a*) in a split RAN environment in accordance with one potential embodiment of communication system 100. At 602, the operations can include remote AP 114*a* receiving constraints from SON controller 116 for a horizon of time (e.g., 10 msec). The remote AP 114*a* may be performing RB scheduling operations for one or more UE (e.g., UE 110*a*-110*b*) as it receives the constraints from the SON controller.

At 604, the operations can include remote AP 114*a* determining local scheduling information available at the remote AP. In various embodiments, the local scheduling information available at a remote AP can include one or more of: HARQ information associated with UE served by the remote AP; a per UE CQI associated with the UE served by the remote AP; and/or per UE bearer packet information (e.g., latency and/or QoS level requirements for packets received by the remote AP) associated with the UE served by the remote AP.

At 606 the remote AP 114*a* performs RB scheduling using the constraints received from the SON controller 116 and the local scheduling information available at remote AP 114*a* and the operations can return to 602 to perform RB scheduling operations according to any additional constraints received from SON controller 116.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module as used herein this Specification, can be inclusive of an executable file comprising instructions that can be understood and processed on a computer, and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrases 'at least one of' or 'one or more of' can refer to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office and, additionally, any readers of any patent issued on this application in interpreting the claims appended hereto, Applicant wishes to note that the Applicant: (a) does not intend any of the appended claims to invoke paragraph (f) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
generating feedback information at a first remote access point (AP), wherein the feedback information is associated with one or more user equipment served by the first remote AP;
transmitting the feedback information to a central controller, wherein the central controller dynamically determines constraint values for the first remote AP for a first horizon of time comprising a plurality of transmission time intervals (TTIs) using an objective function to at least one of: (i) improve meeting delay targets for delay sensitive QoS bearers and (ii) improve fairness of frequency resource sharing across users and bearers, wherein the constraint values are based, at least in part, on feedback information relating to a remote AP other than the first remote AP, and wherein the constraint values for the first remote AP are based on the feedback information received from the first remote AP and feedback information received from one or more other remote APs that neighbor the first remote AP;
scheduling resource blocks (RBs), at the first remote AP, for the one or more user equipment served by the first remote AP for the first horizon of time based, at least in part, on the constraint values received from the central controller;
determining a second horizon of time comprising a plurality of TTIs; and
scheduling RBs for the one or more user equipment served by the first remote AP for the second horizon of time based, at least in part, on the constraint values received from the central controller.

2. The method of claim 1, wherein the constraints are associated with one or more interference levels that the first remote AP can expect, on average, as a function of frequency.

3. The method of claim 1, wherein the constraints are associated with one or more maximum interference level(s) that the first remote AP and the one or more user equipment served by the first remote AP can cause toward the one or more other remote APs as a function of frequency.

4. The method of claim 1, wherein the constraints are associated with one or more maximum interference level(s) that the first remote AP and the one or more user equipment served by the first remote AP can cause toward the one or more other remote APs as a function of frequency and time.

5. The method of claim 1, wherein scheduling RBs for the user equipment served by the first remote AP for the first horizon of time further comprises:
determining local scheduling information available at the first remote AP, the local scheduling information relating to a plurality of user equipment served by the AP; and
scheduling RBs for a first user equipment served by the first remote AP using the local scheduling information available at the first remote AP, including local scheduling information related to at least one user equipment other than the first user equipment, and the constraints.

6. The method of claim 5, wherein the local scheduling information available at the first remote AP includes one or more of:

Hybrid Automatic Repeat Request (HARQ) information associated with the one or more user equipment served by the first remote AP;
a per user equipment Channel Quality Indicator (CQI) associated with each of the one or more user equipment served by the first remote AP; and
per user equipment bearer packet information associated with each of the of the one or more user equipment served by the first remote AP.

7. The method of claim 1, wherein the feedback information includes one or more of:
estimated queue state information associated with one or more queues maintained by the first remote AP for one or more user equipment bearers;
estimated delay information associated with each of the one or more queues maintained by the first remote AP; and
channel state information associated with the one or more user equipment for the first remote AP and one or more user equipment served by the one or more other remote APs that neighbor the first remote AP.

8. One or more non-transitory tangible media encoding logic that includes instructions for execution that when executed by a processor, is operable to perform operations comprising:
generating feedback information at a first remote access point (AP), wherein the feedback information is associated with one or more user equipment served by the first remote AP;
transmitting the feedback information to a central controller, wherein the central controller dynamically determines constraint values for the first remote AP for a first horizon of time comprising a plurality of transmission time intervals (TTIs) using an objective function to at least one of: (i) improve meeting delay targets for delay sensitive QoS bearers and (ii) improve fairness of frequency resource sharing across users and bearers, wherein the constraint values are based, at least in part, on feedback information relating to a remote AP other than the first remote AP, and wherein the constraint values for the first remote AP are based on the feedback information received from the first remote AP and feedback information received from one or more other remote APs that neighbor the first remote AP;
scheduling resource blocks (RBs), at the first remote AP, for the one or more user equipment served by the first remote AP for the first horizon of time based, at least in part, on the constraint values received from the central controller;
determining a second horizon of time comprising a plurality of TTIs; and
scheduling RBs for the one or more user equipment served by the first remote AP for the second horizon of time based, at least in part, on the constraint values received from the central controller.

9. The media of claim 8, wherein the constraints are associated with one or more interference levels that the first remote AP can expect, on average, as a function of frequency.

10. The media of claim 8, wherein the constraints are associated with one or more interference levels that the first remote AP can expect, on average, as a function of frequency and time.

11. The media of claim 8, wherein the constraints are associated with one or more maximum interference level(s) that the first remote AP and the one or more user equipment served by the first remote AP can cause toward the one or more other remote APs as a function of frequency.

12. The media of claim 8, wherein the constraints are associated with one or more maximum interference level(s) that the first remote AP and the one or more user equipment served by the first remote AP can cause toward the one or more other remote APs as a function of frequency and time.

13. The media of claim 8, wherein scheduling RBs for the user equipment served by the first remote AP for the first horizon of time further comprises:
  determining local scheduling information available at the first remote AP, the local scheduling information relating to a plurality of user equipment served by the AP; and
  scheduling RBs for a first user equipment served by the first remote AP using the local scheduling information available at the first remote AP, including local scheduling information related to at least one user equipment other than the first user equipment, and the constraints.

14. The media of claim 13, wherein the local scheduling information available at the first remote AP includes one or more of:
  Hybrid Automatic Repeat Request (HARQ) information associated with the one or more user equipment served by the first remote AP;
  a per user equipment Channel Quality Indicator (CQI) associated with each of the one or more user equipment served by the first remote AP; and
  per user equipment bearer packet information associated with each of the of the one or more user equipment served by the first remote AP.

15. The media of claim 8, wherein the feedback information includes one or more of:
  estimated queue state information associated with one or more queues maintained by the first remote AP for one or more user equipment bearers;
  estimated delay information associated with each of the one or more queues maintained by the first remote AP; and
  channel state information associated with the one or more user equipment for the first remote AP and one or more user equipment served by the one or more other remote APs that neighbor the first remote AP.

16. A system, comprising:
  one or more memory elements for storing data; and
  one or more processors that execute instructions associated with the data, wherein the system is configured for:
    generating feedback information at a first remote access point (AP), wherein the feedback information is associated with one or more user equipment served by the first remote AP;
    transmitting the feedback information to a central controller, wherein the central controller dynamically determines constraint values for the first remote AP for a first horizon of time comprising a plurality of transmission time intervals (TTIs) using an objective function to at least one of: (i) improve meeting delay targets for delay sensitive QoS bearers and (ii) improve fairness of frequency resource sharing across users and bearers, wherein the constraint values are based, at least in part, on feedback information relating to a remote AP other than the first remote AP, and wherein the constraint values for the first remote AP are based on the feedback information received from the first remote AP and feedback information received from one or more other remote APs that neighbor the first remote AP;
    scheduling resource blocks (RBs), at the first remote AP, for the one or more user equipment served by the first remote AP for the first horizon of time based, at least in part, on the constraint values received from the central controller;
    determining a second horizon of time comprising a plurality of TTIs; and
    scheduling RBs for the one or more user equipment served by the first remote AP for the second horizon of time based, at least in part, on the constraint values received from the central controller.

17. The system of claim 16, wherein the constraints are associated with one or more interference levels that the first remote AP can expect, on average, as a function of frequency and time.

18. The system of claim 17, wherein scheduling RBs for the user equipment served by the first remote AP for the first horizon of time further comprises:
  determining local scheduling information available at the first remote AP, the local scheduling information relating to a plurality of user equipment served by the AP; and
  scheduling RBs for a first user equipment served by the first remote AP using the local scheduling information available at the first remote AP, including local scheduling information related to at least one user equipment other than the first user equipment, and the constraints.

19. The system of claim 16, wherein the constraints are associated with one or more maximum interference level(s) that the first remote AP and the one or more user equipment served by the first remote AP can cause toward the one or more other remote APs as a function of frequency and time.

* * * * *

UNITED STATES PATENT AND TRADEMARK OFFICE
CERTIFICATE OF CORRECTION

PATENT NO. : 10,143,002 B2
APPLICATION NO. : 14/993859
DATED : November 27, 2018
INVENTOR(S) : Ritesh K. Madan et al.

Page 1 of 2

It is certified that error appears in the above-identified patent and that said Letters Patent is hereby corrected as shown below:

On the Title Page

On the Page 4, Column 2, item [56], under "Other Publications", Line 3, delete "(UMTD);" and insert -- (UMTS); --, therefor.

On the Page 5, Column 1, item [56], under "Other Publications", Line 1, delete "verizon" and insert -- version --, therefor.

On the Page 5, Column 1, item [56], under "Other Publications", Line 3, delete "F-06921," and insert -- F-06921 --, therefor.

On the Page 5, Column 1, item [56], under "Other Publications", Line 4, delete "2014:" and insert -- 2014; --, therefor.

On the Page 5, Column 1, item [56], under "Other Publications", Line 20, delete "Universal" and insert -- "Universal --, therefor.

On the Page 5, Column 1, item [56], under "Other Publications", Line 22, delete "T525.367" and insert -- TS25.367 --, therefor.

On the Page 5, Column 1, item [56], under "Other Publications", Line 31, delete "Universal" and insert -- "Universal --, therefor.

On the Page 5, Column 2, item [56], under "Other Publications", Line 46, delete "Spefiction:" and insert -- Specification: --, therefor.

On the Page 5, Column 2, item [56], under "Other Publications", Line 50, delete "Institue," and insert -- Institute, --, therefor.

Signed and Sealed this
Fifth Day of March, 2019

Andrei Iancu
*Director of the United States Patent and Trademark Office*

CERTIFICATE OF CORRECTION (continued)
U.S. Pat. No. 10,143,002 B2

On the Page 5, Column 2, item [56], under "Other Publications", Line 57, delete "de" and insert -- des --, therefor.

On the Page 6, Column 2, item [56], under "Other Publications", Line 21, delete "T523.002" and insert -- TS23.002 --, therefor.

On the Page 7, Column 1, item [56], under "Other Publications", Line 47, delete "(Sec. 2009)" and insert -- (Dec. 2009) --, therefor.

On the Page 8, Column 1, item [56], under "Other Publications", Line 47, delete "Ylipoisto ," and insert -- Yliopisto, --, therefor.

On the Page 8, Column 2, item [56], under "Other Publications", Line 12, delete "oublished" and insert -- published --, therefor.

On the Page 8, Column 2, item [56], under "Other Publications", Line 24, delete "RNTl.html." and insert -- RNTI.html. --, therefor.

On the Page 8, Column 2, item [56], under "Other Publications", Line 37, delete "(EUSOPCO)," and insert -- (EUSIPCO), --, therefor.

On the Page 10, Column 1, item [56], under "Other Publications", Line 10, delete "Iaroccasolutions" and insert -- laroccasolutions --, therefor.

On the Page 10, Column 1, item [56], under "Other Publications", Line 56, delete "Anti Polis" and insert -- Antipolis --, therefor.

On the Page 10, Column 1, item [56], under "Other Publications", Line 63, delete "Anti Polis" and insert -- Antipolis --, therefor.

In the Specification

Column 1, Line 20, delete "subscribers," and insert -- subscribers --, therefor.

Column 2, Line 51, delete "of the of the" and insert -- of the --, therefor.

In the Claims

Column 32, Line 9, Claim 6, delete "of the of the" and insert -- of the --, therefor.

Column 33, Line 29, Claim 14, delete "of the of the" and insert -- of the --, therefor.